United States Patent [19]

Barber, Jr.

[11] Patent Number: 4,885,949
[45] Date of Patent: Dec. 12, 1989

[54] CONTINUOUSLY VARIABLE OR FIXED RATIO VELOCITY TRANSMISSION MECHANISM

[76] Inventor: John S. Barber, Jr., 12529 Western Cape, Creve Coeur, Mo. 63146

[21] Appl. No.: 267,489

[22] Filed: Mar. 14, 1988

[51] Int. Cl.$^4$ ............................................. F16H 15/16
[52] U.S. Cl. ........................................ 74/193; 74/200
[58] Field of Search ................... 74/193, 199, 200, 201

[56] References Cited

U.S. PATENT DOCUMENTS

| | | | |
|---|---|---|---|
| 1,865,102 | 6/1932 | Hayes | 74/200 X |
| 2,123,006 | 7/1938 | Hayes | 74/200 |
| 3,153,938 | 10/1964 | Perry | 74/200 |
| 3,267,756 | 8/1966 | Perry et al. | 74/200 |
| 3,810,398 | 5/1974 | Kraus | 74/200 |
| 4,159,653 | 7/1979 | Koivunen | 74/200 |
| 4,272,999 | 6/1981 | Perry | 74/200 |
| 4,275,610 | 6/1981 | Kraus | 74/200 |
| 4,297,918 | 11/1981 | Perry | 74/200 X |
| 4,355,547 | 10/1982 | Poole et al. | 74/200 X |
| 4,499,782 | 2/1985 | Perry | 74/200 |
| 4,524,641 | 6/1985 | Greenwood | 74/200 X |
| 4,570,501 | 2/1986 | Perry | 74/200 |

Primary Examiner—Rodney H. Bonck
Assistant Examiner—Janice E. Chartoff
Attorney, Agent, or Firm—Paul M. Denk

[57] ABSTRACT

A traction transmission mechanism comprising toric shaped inner and outer race elements, a series of pairs of transmission rollers arranged between the race elements, and drive shaft and driven shaft or other structure constructively cooperating with the mechanism, to furnish an output force, with the transmission incorporating various load equalization structure to furnish substantially floating characteristics to one of the supported race elements, to provide radial and tangential shifting to the roller elements as arranged between the race elements, and to adjust one of the race elements, or more specifically one of its pair of races, towards or away from each other, to change the traction force generated within the transmission mechanism during its functioning.

40 Claims, 10 Drawing Sheets

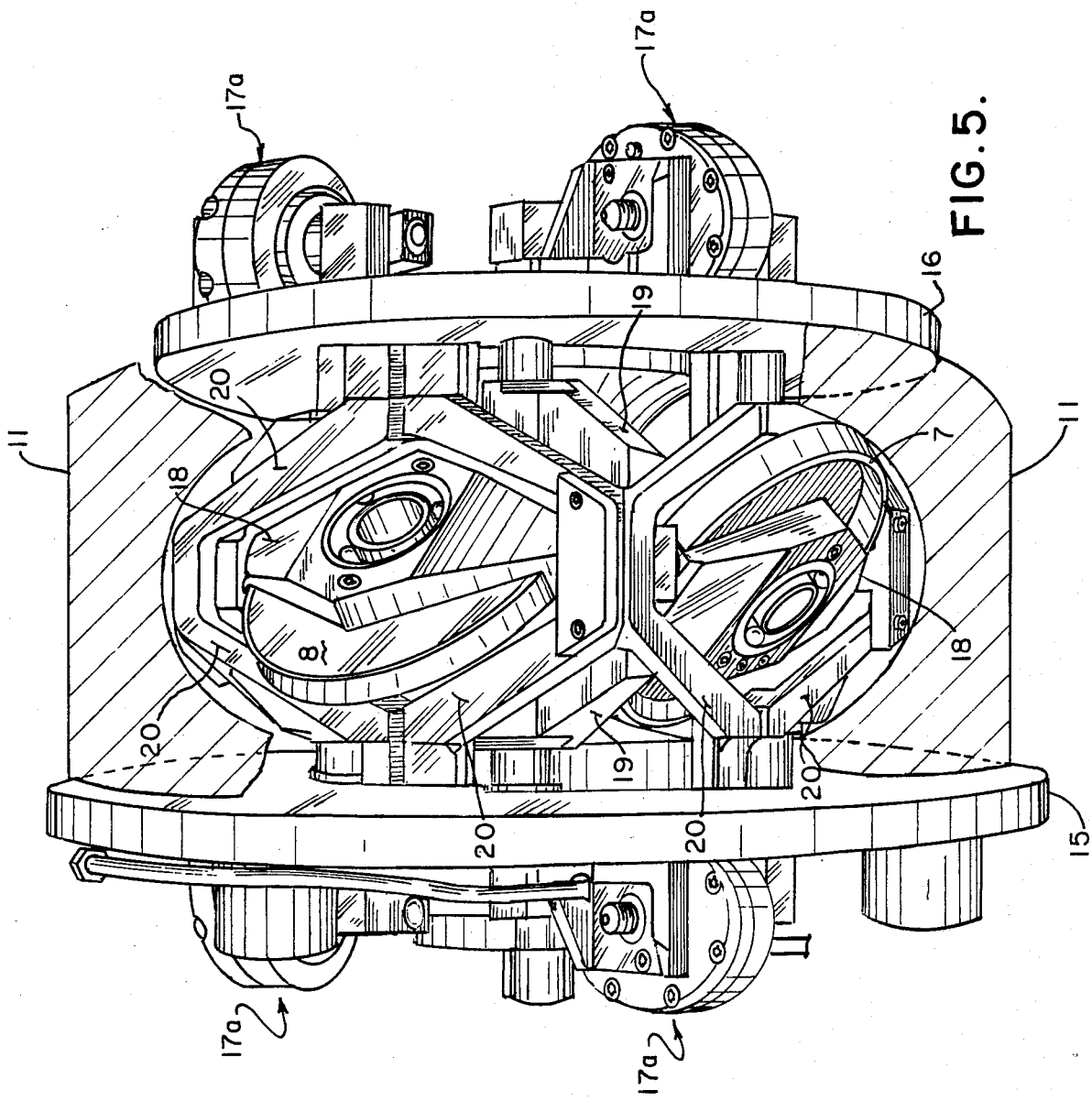

CONTINUOUSLY VARIABLE OR FIXED RATIO VELOCITY TRANSMISSION MECHANISM

BACKGROUND OF THE INVENTION

This invention relates generally to improvements in a continuously variable transmission, and more specifically pertains to a variable transmission incorporating a combination of race elements and transmission roller means, which are finely adjusted and regulated through a variety of equalization means, in order to provide a more compact structure for furnishing a highly efficient output of precisely controlled torque than has heretofore been obtained.

The prior art is replete with a variety of variable speed transmission mechanisms, of the type that are rather complex in structure, but which heretofore have been mainly concerned with the arrangement and functioning of roller means between cam-like disc means for furnishing variations in the power or speed of output from the transmission, but which normally have not provided fine adjustment in the structural relationship of the various components making up the transmission, in order to enhance their efficiency of operation, and particularly for sustaining a long and useful operative life. For example, the single cavity, toroidal variable speed drive design had been derived from the dual cavity continuously variable transmission (CVT) research that had been early conducted by British Leyland and General Motors Corporation, probably over the past fifty years. Examples of these types of experimentation and research are generally disclosed in the very early patents to F. A. Hayes, such as in the U.S. Pat. No. 2,123,006, which showed and described a friction transmission mechanism, incorporating a single pair of axially spaced coaxial discs, having inward facing toroidal grooves, as used in combination with the second pair of such discs, in order to provide a variation in the output torque from its input drive mechanism. And, in order to achieve that variation in speed, and hence, the consequential torque, angular adjustment of the rollers of Hayes could be made in order to induce a variation in the speed-ratio of the mechanism. Another patent to Hayes, U.S. Pat. No. 2,123,008, shows an additional variation upon his early power transmission mechanism. In this particular patent, Hayes disclosed a mechanical mechanism for enhancing the pressure exerted upon his disc, within their toroids, in order to increase the tractive, or traction, pressures that could be produced for his corresponding load, without causing any difference in the speed-ratio positions of his shown sets of rollers.

Actually, the basic concept for the use of toroid type of drives in transmissions was early patented, back in 1877, by C. W. Hunt, as disclosed in his U.S. Pat. No. 197,472, wherein was initially shown the variable transmission of the single cavity design, that required end load forces to provide sufficient normal force on the torque rollers to transmit generated torque between the two disclosed toroids. Following this, it was Hayes, in the patents as previously disclosed, that provided some improvement upon that early concept, in an attempt to develop a commercially feasible product. But, it is well known in the industry that while both of the previously mentioned companies attempted to commercialize through practical engineering design the concept of the continuous variable transmission, particularly for use for application within automotive developments, the problem with refinements to such transmissions, so that they could operate with some degree of longevity, caused the type of problems that indefinitely postponed the installation of these type of transmissions into commercial automotive products. In other words, the components, and the fatigue of the materials used in their construction, just would not allow the standard introduction of these designs into automotive products.

Another basic reason why these prior art type of transmissions were not applicable for commercial usage at the times of their inception, was primarily due to the fact that, in addition to the other reasons as previously defined, they were just too bulky and large in their construction to provide for their effective usage in the smaller type of vehicles, such as the automobile, and truck, then available at that period of time.

Metallurgical developments in the 1950's and 1960's spawned the production of quality steels and other metals that could be used in the fabrication of the types of components that were needed to construct quality transmissions of the foregoing type, and as a result, CVT technology benefited by attaining the usage and application of the types of metals that could extend the fatigue life of the components and products assembled into transmissions of this design It was during the late 1960's that companies, such as Monsanto Company, in conjunction with select automotive companies, developed a new traction fluid/lubricant for use in conjunction with toric drives that also yet additionally enhanced the fatigue life of metals, and product component usage. It is known that General Motors planned to include such a drive for use in the transmission and control or variation of torque within more heavy vehicles, such as commercial vehicles or school busses, or the like. But, apparently funding was not available in order to see such corporate activity through to fruition. Fortunately, research companies completed the development of traction fluids such as synthetic oil to generate high friction under pressure, and can be used for this particular purpose, and such fluids, one being identified under the trademark SANTOTRAC, and available from the said Monsanto Company, is on the market today for use in traction type drives, as employed in the power transmission industry. Similar and related types of transmission fluids are available from many other companies currently.

Select automotive companies have now continued to support further research upon this type of transmission, and as a result, during the 1970's, there was developed a CVT type of transmission that incorporated a metal belt or link type drive, generally identified as the Van-Doorne, as known in the trade. The VanDoorne CVT offered a compact and seemingly simple design that is easily integrated with the front wheel drive type vehicle, one which has become rather in vogue over the past decade. On the other hand, it is also known that select automotive companies, who have been pursuing this type of project for the past fifteen years, have withdrawn from the same, and taken back their reserve funding, due to the unsolved reliability problems that have prevailed and plague the operations of these type of transmissions. It is known that British Leyland has continued to conduct research in the dual cavity type of toroid design, and it is known that it plans to include it in production within bus transmissions in the very near future Examples of the dual cavity type of toroid design are shown in Perry U.S. Pat. No. 4,272,999, and Perry has done extensive research and patenting on that type of transmission, as can be noted in his variety of U.S. patents, such as U.S. Pat. Nos. 4,297,918; 4,272,999; 4,628,766; 3,406,597; 4,570,501; 2,959,063; 3,306,119; 3,153,938; 4,499,782; 4,257,495; 3,276,279; 3,267,756; 3,203,267; and 3,184,990. As can be seen therein, most, if not all, of the designs as shown in those prior patents pertain to dual cavity type drives, using dual cavity toroid configurations for attaining variable speed power transmission. Such designs, nevertheless, do incorporate not only the drives, but also their particular control systems, in order to effect some variation in the speed, the torque ratios, and the outputs attained from the transmissions. But, as can also be particularly noted therein, much of the control means incorporated into those types of systems, as shown, are of a mechanical nature, and yet do not provide the fine regulation in the operations of a transmission of this type, which will necessarily enhance the longevity and usefulness of their application, particularly when incorporated and installed within the type of products, such as automotive products, that are run continuously and on a daily basis, and which are expected to run as such for many years, by the customers and end users.

It must be noted, that much of the work of Perry, in the dual cavity type of toroid designed transmissions, derives yet from early efforts conducted by Mr. Hayes, as previously explained. Examples of some additional earlier Hayes patents, incorporating the dual drive feature, are shown in the friction transmissions disclosed in his U.S. Pat. Nos. 1,867,149; 1,904,046; 1,856,249; 2,124,399; 2,124,398; 1,984,797; 1,698,229; 1,865,102; and 1,919,218.

The foregoing is an analysis of the early and intermediate developments made to the continuous variable transmissions, whether it be of the single toroid or dual toroid cavity types, and the extent to which they have been developed, and chronologically patented, as reflected in the identified U.S. patents.

But, the current invention, as to be hereinafter summarized, is believed and does provide rather unique refinements to the functioning of this type of transmission, and particularly incorporates a variety of equalization means that have a tendency to refine the operations and functioning of such a transmission, significantly makes it compact in design, of reduced weight, much more efficient in operation, and having significant useful and longer life, even in standard and routine commercial applications.

SUMMARY OF THE INVENTION

As previously commented, the principle of this invention is to provide a continuous variable transmission of enhanced efficiency and which incorporates significant refinements, such as the aforesaid equalization means as incorporated therein, to provide a transmission which has been found, through prototype design and development, to be very practical in design, unique in construction, easy to assemble, quite functional in operation, and highly efficient in performance for the results obtained therefrom.

This invention contemplates the formation of at least a single toroid cavity structured transmission, of the continuously variable speed type, and one which provides for refinement in the functional speeds attained during operations of the transmission, regardless of what may be the input torque imposed upon the input means of the design, or the output torque or speed desired to be derived therefrom. Obviously, the essence of this invention, and with the incorporation of various equalization means within its functional structure, is intended to provide and does attain a very smooth operating transmission, to afford continuous but variable control of its output speed, as explained, regardless of what may be the input torque or speed, so that when incorporated within, as for example, an automobile or other vehicle, it will provide very efficient and very fine control to the operator, as for example not only while routinely driving upon the roadway, but particularly when high acceleration speeds or torque may be required, as when promptly leaving a stop, when passing, or even when deceleration may be required. Obviously, this type of transmission is designed for incorporation within and for use in conjunction with other type of clutch means, so that when it is required to shift the vehicle into neutral, such can easily be done, without any effects upon the functional operations of this transmission. On the other hand, when a shift, either manually, or automatically, may be required for attaining some speed of movement for the vehicle, a simple exertion of force upon a drive means, such as a fluid hydraulic or other pressure exerting pedal means, not too unlike that which may currently be used as the standard gas accelerator pedal, can be readily manipulated by the vehicle operator, and attain related type of driving movements, perhaps even at a more efficient pace, than are achieved from vehicles of the current operating design, and incorporating what is well known as the standard or automatic type of transmission.

More specifically, the design of this invention, readily admitted, does incorporate, at least in overall appearance, the usual type of race means, generally formed of the inner and outer toroid design, and having the cam disc, in this particular instance, identified and structured more in the nature of transmission roller means, generally arranged intermediately thereof, and which are designed for the transmission of torque, and force, between an inner to outer race, or even perhaps from an outer race element to an inner race means, depending upon the design desired for the transmission of a particular configuration and application. But, the concept of this current invention, as can be readily seen from the drawings, and which will be subsequently defined in the preferred embodiment, incorporates transmission roller means of their own unique design, being rather effectively bearing mounted, for reduced frictional functioning, and likewise, being supported through the application of lever arms, frame means, support means, and all interacting and co-operating through interconnected and mutually operating structural components, that provide a highly effective transmission mechanism, which, in the already built and functionally operative prototype, operates quite effectively for attaining the enhanced results for a transmission of this design, and which is submitted, and believed, to be much more efficient than what has ever been attained from those as previously described or shown in the prior art. In addition, what is a most significant enhancement in the design of this invention is that the transmission means is highly compact of structure, can be uniquely encompassed within a rather streamlined transmission case, yet having all of the various controls, including the variety of equalization means, readily adaptable and constructed within it, for ready application and installation within an automotive or other vehicle design, or for other industrial applications, as may be readily required. The inventor himself is yet uncertain as to the widespread applications that can be made of his design, but believes that a transmission of this type could readily be used in vehicle and industrial drives, in heavy duty farm equipment, in other industrial equipment, can even be modified for usage within the aircraft industry, and for what other infinite variety of applications that can conceivably be made of a transmission of this type and design. What is important, as reviewed from the background of this invention, is that most of the developments heretofore have apparently just not been refined, nor were they capable of refinement, to achieve the type of installations within commercial products that is envisioned and believed readily available for the transmission of this current invention.

The transmission of this design, as previously summarized, incorporates at least two pairs of transmission roller means, although it is likely that other groups or pairs of roller means, generally in pairs of two or more, as compounded, can be incorporated and designed into the transmission of this construction, depending upon the power output requirements needed from the transmission, and overall ratio velocity range, and the effectiveness and efficiency of operation sought, in addition to the smoothness of operation, as may be required. Thus, while the preferred embodiment of this invention shows two pairs of transmission rollers used in the current design, it is just as likely that six transmission rollers, eight transmission rollers, ten transmission rollers, etc., could be adopted into the design of this particular transmission. Although, it has been determined that rollers in excess of eight may be impractical of application in addition to substantially reducing the overall speed ratio range down to where it may be ineffective. But, on the other hand, it is conceivable that more than one roller arranged in adjacency may be employed upon each trunnion shaft and operate effectively to obtain the desirable results of this development.

Generally, the transmission is housed within a case, or other supporting structure, and usually incorporates an input shaft, that is centrally and bearing mounted within the said supporting structure, and is a normal means through which the input force or torque is applied to the transmission. This input shaft has mounted thereon the inner race element of this design, but as will be subsequently analyzed, even this inner race element is of a split variety, forming a pair of race surfaces, and which race surfaces are adjustable for displacement or relative movement towards or away from each other, for providing a means for adding to the force exerted upon the roller means during their functioning within this style of transmission. There is an outer race element disposed around the periphery of the arranged transmission roller means, and it is upon the inner surface of this outer race element that the rollers likewise contact through traction force for inducing the transmission of rotational force from the input shaft, through the inner race element, and to the outer race element, during functioning. The outer race element, likewise, may be fabricated of halves, formed as a pair of outer race surfaces, and which may be displaced with respect to each other, in order to regulate the degree and quantity of force exerted upon the transmission rollers, during their functioning, and to facilitate the transmission's assembly. What is to be noted, though, is that each pair of roller means are arranged at a particular angle which is directly opposed to the angular adjustment and relationship of the next adjacent pair of rollers arranged to either side of said first pair of rollers. The reason for this, as can be readily understood from this disclosure, is that the forces exerted by each pair of transmission rollers, with respect to the forces exerted by the next adjacent pair of transmission rollers, are in equal and opposite directions, and therefore, equalize each other, thereby reducing, if not eliminating, the generation of vectorial forces at the outer perimeter or periphery of each of the shown rollers, and likewise, neutralize and balance off the forces generated upon the surface of the inner race elements, thereby reducing, if not eliminating any pressures that would otherwise be generated upon the bearings that mount the input shaft of this particular transmission. Thus, through this type of designed structure, thrust bearing loads are completely minimized, if not eliminated.

This summarization of the transmission means of this invention, as being made herein, obviously presupposes that the input torque to the transmission is through an inner centralized input shaft and associated race means, but likewise, it is just as likely that the input torque or force may be derived and exerted upon the outer race element of this transmission, and then transmitted through the various roller means to and through the surface of the inner race means, for providing an output torque for use in application through a centralized and connected shaft or other output means, as shown and described as the input driving means for this invention. In addition, there are an infinite variety of structures and means that can be modified into the transmission of this design to provide either shaft input, bearing type input, planetary gear type input, or any of these adopted for output, when considering the construction, usage, operation, and results to be obtained therefrom, for a transmission of this design, and for generating enhanced and more variable speed output torque, from an input drive means or mechanism. Such will be explored in greater detail subsequent hereto.

What is essential about the design of this particular transmission are the variety of equalization means that are designed into its construction. For example, one such equalization means has already been alluded to, when defining that the inner race element, and for that matter, even the outer race element, might be split, and formed of halves, and be adjustable relative to each other, in order to provide for that maintenance of the degree of force that may be exerted upon and required in order to attain an effective and proper traction force upon the various rollers, within their toroidal cavity, intermediate of the inner and outer race elements. In addition, the means for installation and mounting of the various race elements, likewise, is done in this particular invention in a manner that allows either the inner or outer race element, but more particularly in the design of the preferred embodiment, to obtain some floating characteristics for the outer race element. This floating characteristic provides for a freely movable, or substantially floating, characteristic for the outer race element. This compensates for any imbalance in forces generated and exerted through the variety of roller means, and thereby provides means for compensating for any variation or discrepancy in the forces generated therethrough, and tends to equalize the same, to attain that balancing of forces generated through each of the pairs of roller means. This also has the beneficial effect of minimizing any unbalancing of forces or movements exerted upon the bearings that mount the inner race element, and the axially or centrally arranged shaft supported therein during transmission usage. As can be readily understood, if, as shown in the prior art devices, unequal forces are generated upon select of the roller or disc means during continuous functioning of those shown transmissions, it is not too long when such imbalancing of forces can lead to their deterioration, and a rapid destruction or wear out of the transmission themselves, because they lack normal load balancing. This type of deterioration is just unacceptable to any commercial transmission. But, the transmission of this current design, as just explained, incorporates this additional such equalization means, in the mounting of its outer toroid, in order to balance off any unequal forces that may be generated, through the traction developed by the rollers intermediate of its supporting race element surfaces.

On the other hand, and while it has been explained and summarized herein that the outer race element may have substantially floating characteristics, it is just as likely that the bearing mounting of the inner race element, and its drive or driven shaft, centrally and bearing mounted therein, could likewise be constructed having some degree of free floating characteristics, so that it either in combination with the outer race element, or independent of the outer race element, can provide the means for compensating for any inequality in the generated traction forces during functioning of this particular transmission.

More specifically, though, and with respect to the design as shown herein, the outer toroid or race element is designed to have free floating characteristics in the category of circumferential shift, by itself, or tangential shift, with some degree of limited yaw and pitch movements, and even axial shift, in order to attain, rather instantaneously, that balancing of any forces that may be independently generated within select transmission roller means during functioning of this particular transmission. As a readily apparent example, should this transmission be embodied within a vehicle, and the vehicle encounter a rather abrupt impacting force, such as the hitting of a bump, or falling within a roadway pothole, it is readily apparent that such type physical forces generated upon the vehicle can be transmitted into and through any transmission, embodied within the vehicle, even one of this current design. But, this particular invention, as explained and summarized herein, provides means for ready compensation and minimizing of any type of erratic forces that may be generated, and balances them out rather promptly so that they have minimal effect upon the physical structure and functioning of the transmission of this design.

Another example of an equalization means, as summarized herein, and as constructed within the structure of this invention, has to do with the mounting of the transmission roller means themselves. For example, in the preferred embodiment of this development, there is a first support, generally in the form of a plate, that bearing mounts the input or output shaft that supports the inner race element. This particular support means is generally located adjacent, or to one side of the arranged inner and outer race or toroid forming means. In addition, there is a second support means or plate arranged to the opposite sides of the inner and outer race elements. There is a frame means that extends between or intermediate that spacing arranged between the inner and outer race elements. In fact, there is one such frame means arranged between each of the circumferentially adjacent rollers of the variety of transmission roller means adapted into this construction. This frame means provides for stable construction and rigid support between these said support means. The variety of transmission rollers are generally trunnion mounted between these rigidly emplaced frame means. But in addition, each trunnion mounted roller means is positioned between frames by means of pivotally mounted lever arm means. These lever arm means are generally U shaped in configuration, extending between each pair of adjacent roller means, and are pivotally mounted to each of the previously identified support means. Thus, the frame means provide a support for each trunnioned roller at one end, while a lever arm generally supports each roller at its opposite end. It is significant to note that these lever arms provide for the convenient positioning of the trunnion mounted rollers within the transmission structure, and for the following purpose. Obviously, upon reviewing the drawings and structure of this invention, it can be seen that the primary support for the roller means within the transmission is generally achieved through their traction mounting between the inner and outer race elements. But, as a variety of forces are generated upon these roller means, particular during high speed or heavy duty functioning of this transmission, such explained equalization means must be provided, and have been designed herein, to compensate for any of these additional imbalancing of forces, and irregularity of pressures, that may be sustained by the rollers during transmission operation. The lever arm means of this invention are designed to provide at least two additional equalization functions for these rollers within their operations. Initially, each of the lever arms, as explained, loosely mounts or positions an end of a trunnion that holds each roller. And, each of the lever arms are designed for limited pivotal movement within their positioning between their supports. This has been described. Hydraulic means are provided for affording some pivotal movement to these lever arms. When a lever arm is pivoted, ever so slightly, it has a tendency to shift somewhat tangentially each trunnioned roller, or that one which it mounts, in a somewhat circumferential tangential direction, with respect to its positioning upon the interior surface of the outer race element, and the interior surface of the inner race element. Thus, as can be understood, and which has been experienced by the inventor in the functioning of his prototype, when a trunnioned roller is shifted tangentially between the race elements, it changes, ever so slightly, its point of contact with these identified surfaces of the said race elements. As a result, with respect to all of its rollers, as these points of contact vary, induced forces transverse to the rolling direction of the rollers at their points of contact with the races cause the rollers to undertake some degree of pivot about their trunnion axes from either an approximate vertical disposition, as at one limit, to a near horizontal level, as at their opposite limit, thereby varying the speed at which, for example, the inner race element can drive the outer race element during its tractioned rotation and functioning of this transmission. As for example, as can be seen in FIG. 3 of the drawings, when each roller is in the position as shown in that particular structural configuration, which is at or approximately a vertical disposition between the race elements, the transmission is at that position where it can attain a minimum speed of rotation for the outer race element, assuming that the shown input shaft and the inner race element are providing the driving force for the transmission rollers, for the pairs of which are shown therein. But, when the lever arm functions to shift the roller elements, as previously explained herein, tangentially, or slightly along the circumference of their arrangement within the formed toroid of the transmission, and the roller elements contact at a slightly displaced location along the outer periphery with the surface of the inner race element, this has a tendency to cause the roller elements to inherently pivot about their trunnion axes, and which when effected, will cause, for example, the upper roller to pivot counterclockwise, and its paired lower roller to pivot clockwise, both into that near horizontal condition, as shown in hidden line therein. This provides for a variation in the speed of rotation at a greater velocity for the outer race than that which can be obtained when the rollers are in the more vertical position as shown in said FIG. 3, as previously explained. Thus, the lever arm means as summarized herein is another form of equalization means which also has the direct benefit of providing for variations in the speed of output from the transmission, when its hydraulic or other actuation means are adjusted to provide for this manipulation in the repositioning of the transmission roller means.

Another equalization means is likewise provided within the structure of the transmission rollers, and is also embodied within the structure of the frame means configuration, while acting in conjunction with the lever arm, as previously described, and which provides for the limited radial displacement of the trunnioned rollers between the races of this particular transmission. This additional equalization means provides for a shifting of the rollers slightly radially either away from or towards the central shaft, or the supporting inner race element. This particular means for adjustment is provided at the one end of each trunnion that supports a roller means of this invention. Generally, one end of each trunnion has an extending shaft, that locates within a slot formed within, preferably, the next adjacent frame means, arranged and disposed at the opposite end of a trunnioned roller, and that end of the trunnion or gimballed roller is designed for limited shift either radially or axially along a line synonymous with the roller-races point of contact. Thus, it is likely through design, manufacturing incongruities, or variations because of manufacture, or simply through wear, that the location of the surface of either the inner or outer race elements, or even the rollers themselves, may vary in dimension with respect to one another. When that occurs, it may be that too much force may be exerted upon one roller, during an instantaneous moment, and lesser traction force exerted, as for example, upon the oppositely disposed roller. Thus, the capability of this radial displacement for each of the rollers through this additional equalization means is designed to provide for a ready compensation in this imbalance of any traction forces encountered, between the rollers, and in combination with the free floating characteristics of the outer race element or outer toroid surface, can quickly compensate to provide a balancing in the traction forces sustained and experienced by each roller during transmission functioning. Obviously, in light of the description of the result desired in achieving this type of equalization means as defined herein, other forms of structural relationships built into the design of the trunnioned rollers, and their support at either end by either the lever arm or the frame member, could be designed to provide for this desired radial shift to attain any instantaneous equalization of unbalanced forces. Even theoretically, it is possible that one end of each trunnioned roller may be totally unsupported, and simply held into position by means of its connection at the opposite end with a pivotal lever arm, and sustained within the toroid cavity, through its positioning intermediate the inner and outer surfaces of the said race elements, and yet, obviously, be free floating in characteristic in order to attain that instantaneous radial shift necessary to buffer any imbalancing of traction forces exerted during transmission operation.

One other feature that needs to be summarized within the context of this invention is the relationship between the various support means or plates that are used to structurally stabilize the installation of these various components together within this transmission means. For example, as previously stated, there is an initial support means or plate to which the input/output and centrally arranged shaft is bearing mounted. And, it is upon this shaft that the inner race element, the various roller means, and the outer race element are generally affixed or supported for their functional operations. In addition, there is an outer or opposite side support means or plate that is arranged adjacent the other side of these operative elements. But, as in the preferred embodiment, where the outer race element may comprise the output portion of the generated torque, or variations in speed attained through the functioning of this transmission, obviously, that particular outer race element must undertake rotation, in conjunction with the force and torque transmitted from the inner race element, and any output to be attained from this transmission must be derived through this identified outer race. And, in the preferred embodiment, where it is desirable to attain the coaxial form of output from the input shaft, through an output shaft, as that form of output torque from this transmission, it can be seen that the second or opposite side support means or plate must be cantilever supported with respect to the input shaft of this transmission. This is attained and acquired through the usage of the previously identified frame means that extend through the spacing intermediately arranged between the inner and outer race elements of this particular invention. Hence, by supporting the opposite plate in this cantilevered fashion, a spider or other output means may be secured with a surface of the outer race element, extend around the second support plate, and its operating hydraulic control means, to connect with a splined output shaft, or other output means, for affording that coaxially derived power output from the transmission during its functioning. On the other hand, the inventor readily recognizes that other forms of output can be derived from the outer race element of his design, as for example, a form of planetary gear may be connected therewith, or perhaps the outer surface of the outer race element may be formed having integral gear teeth, and intermesh with one or more, preferably equally arranged gearing, provided to either side of the race, and each incorporating its own output means or driven shaft for attaining output torque from the transmission of this design. These are just examples.

As previously alluded to, this invention also envisions the usage of actuating means, such as hydraulic piston and diaphragm actuating means, for use for providing the various shifting movements to each trunnioned roller, and particularly providing the pivot to the lever arm controls supporting the trunnioned roller means to attain that tangential shifting for the latter during application of this invention. And, in order to provide complete equalization in the functioning of this transmission, in the preferred embodiment, the actuating means, herein designed as hydraulic functioning means, are arranged to either side upon each of the support plates of this transmission housing, and function in parallel to act upon the said lever arms to achieve their pivoting, along both sides, to assure preciseness in their functioning, and to further attain simultaneous and exact tangential shifting of each of the lever arms, for each of the trunnioned roller means, during transmission functioning. Obviously, other forms of actuation, other than hydraulics, are feasible for usage.

As an example of the usage of this invention in operation, as for example within a motor vehicle, the hydraulic control means of this invention for exerting that hydraulic or other pressure and manipulation to the lever arms for regulating the positioning of each roller means, can attain its functioning and control from a single, for example, pedal, equivalent to that which is already in use in all vehicles in the nature of an accelerator pedal. All the operator needs to do is simply depress the pedal, exert hydraulic force through the various hydraulic pistons of this invention, thereby forcing each of the lever arms supporting each roller means to shift pivotally, thereby causing each roller means to likewise shift tangentially in its positioning within the toroid formed intermediate each of the inner and out race elements, and thereby change the speed that may be attained from this transmission, in the manner as previously explained. This causes the roller means to traverse between their vertical or perpendicular disposition, as shown in FIG. 3, to the more horizontal, as when speed is being increased or accelerated, through the operations of this transmission.

Yet another form of equalization means, but one that is more designed to sustain a proper traction force upon the rollers, as exerted upon them between the inner and outer race elements, is as follows. The inner race element, as previously explained, may be formed as a split type of toroid surface. And, hydraulic or other force may be exerted upon one or both of the split surfaces, as along their side edges, and either cause said surfaces to move towards each other, thereby providing a tightening in the biasing force that it exerts upon its supported rollers, or said toroid halves may displace with respect to each other, and thereby lessen or lighten the traction force exerted upon their supported rollers. In addition, a structure is built into the design of this invention, in the preferred embodiment, that allows for a hydraulic or other force to be exerted upon one of the inner race element half parts, to cause it to shift towards the other, while at the same time, automatically effects a shift in the other inner race part towards the first, to provide for an equalization of the traction force exerted upon all of the various roller elements that are in traction contact with their respective surfaces, as can be seen in FIGS. 1 through 3 of the drawings. On the other hand, it is likely that the outer race element could likewise be constructed in a similar manner, with their halves or parts being force shifted either towards or away from each other, in order to vary that traction force that is exerted upon the variety of roller means in contact with their outer formed toroid surfaces.

It is, therefore, the principal object of this invention to provide a traction form of transmission mechanism that provides precise control over the operative components of this operating transmission, through equalization means that balance the forces generated within this transmission during routine functioning.

Another object of this invention is to provide a variable speed transmission incorporating a pair of race elements, inner and outer of design, and which may be uniquely constructed as segmented race surfaces, in order to attain more precise control over the forces generated within the transmission roller means, and likewise perhaps obtain a greater traction force when such may be required.

Another object of this invention is to provide for equalizing and balancing of the forces generated within roller means embodied within the continuously variable transmission by furnishing means for shifting each roller means independently radially with respect to its positioning within the operating transmission device.

Still another object of this invention is to provide means for shifting of the roller means within this transmission along tangential dimensions to provide variation in the speed generated from the input to the output means of this transmission.

Yet another object of this invention is to incorporate hydraulic control means, or other actuating means, in combination with equalization means, to provide both speed control and force balancing within a continuous variable speed transmission.

Another object of this invention is to provide means for affording compensation in the balance of forces generated within an operating transmission, by furnishing free floating characteristics to one or more of its race elements, within its structured embodiment.

Still another object of this invention is to provide variations in the output means that operates in conjunction with a transmission, and which incorporates flexible couplings to compensate for any shift in the free floating mounting of its various operating mechanisms, such as the race elements, for a transmission of this design.

These and other objects will become more apparent to those skilled in the art upon reviewing the description of the preferred embodiment set forth herein, when undertaken in conjunction with a study of its drawings.

BRIEF DESCRIPTION OF THE DRAWINGS

In referring to the drawings,

FIG. 5 is an oblique isometric view, from above, disclosing the transmission means of this invention with the outer race element shown in section;

DESCRIPTION OF THE PREFERRED EMBODIMENT

Figure 1:
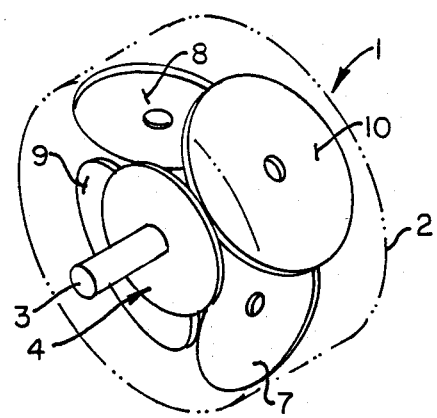
FIG. 1 provides a schematic view of the continuously variable transmission means of this invention, shown incorporating two pairs of transmission roller means within its construction.
Figure 2:
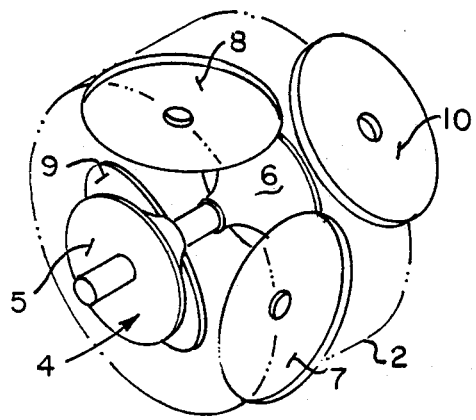
FIG. 2 provides a similar schematic to that of FIG. 1, with one of the roller means being displaced, to provide a view of the arrangement of the pair of separated race surfaces as shaft mounted for forming the inner race element of this invention.

In referring to the drawings, and in particular FIGS. 1 and 2 thereof, the basic schematic of the essence of this particular invention is shown. As disclosed, the continuous variable transmission 1 shows what is generally, in phantom line, its outer encasement, as at 2, which may comprise the external surface of an outer toroid forming race element for this development. Shown contained therein, and mounted for precision operation, is the input or output centrally arranged shaft 3, which, in the preferred embodiment, and in this particular instance, functions as the input shaft or driving shaft in which torque is supplied to this particular transmission, during its application. Mounted for rotation upon this particular shaft is an inner race element 4, which in this particular instance, is actually shown as comprising a pair of races, as at 5 and 6, and which furnish the input traction sufficient to provide for rotation of the pairs of transmission rollers, 7 through 10, which, upon rotation, transmit a traction force to the surface of the outer toric race element 11, or the outer toroid, as generally identified herein, to provide for an output torque to a driven member and which furnishes that precision in the variation of speeds of operation of the transmission, during its functioning, between that input torque or force applied to it by the driving means, for generating some transmitted but controlled torque to the driven means, as will be subsequently described.

Figure 3:
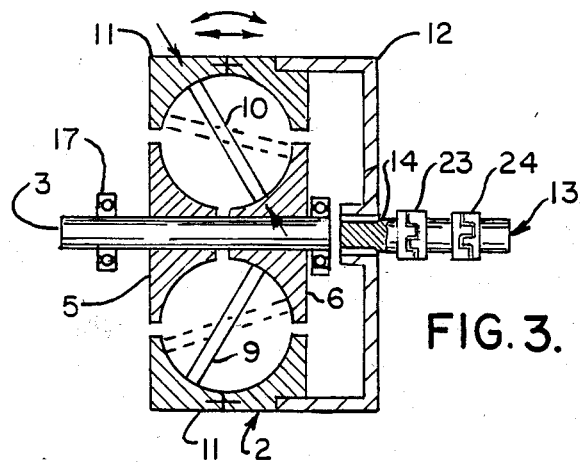
FIG. 3 provides a schematic vertical sectional view through the transmission means of this invention, showing a pair of the roller means arranged intermediate the inner and outer race elements of this invention.
Figure 10:
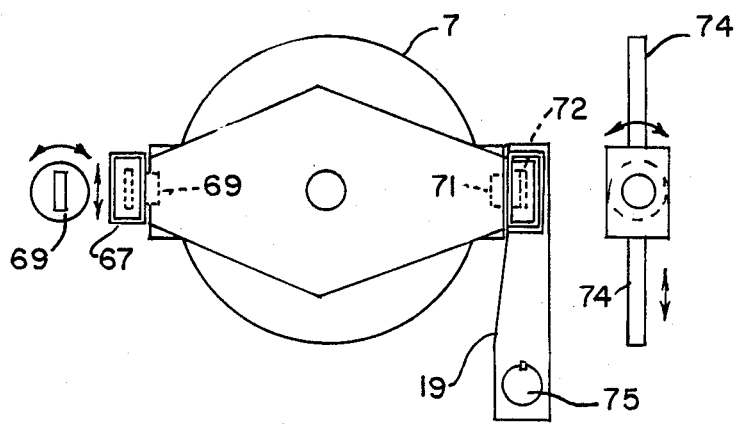
FIG. 10 a side view of one of the roller means of this invention, trunnion mounted, with its positioning lever arm shown at its right side, and the radial adjusting support means for the trunnion, shown at its left side, and also showing schematically end views of the roller means and the positions of shift that are undertaken as disclosed by directional arrows.

As can be seen in FIG. 3, the input shaft 3 is splined or otherwise connected to the inner race elements 5 and 6, and are in traction communication with the various roller means, in this particular instance, the pair of roller means 9 and 10, being shown. And, as previously explained, these particular rollers, as with all of the pairs of rollers embodied within this particular construction, are arranged in traction engagement or contact with the inner surface of the outer race element 11, which, in this particular figure, may give the appearance of being separate race elements, but, which in actuality, is a single outer race element forming the integral toroid surface that surrounds the entire emplacement of the various pairs of roller elements, as previously defined. Thus, it is the traction force transmitted through these roller elements that provides for the controlled rotation of the toric outer race element 11, which in turn transmits its rotational force to the driven means, which in this particular instance, is disclosed as a spider means 12, for transmission of the driving force to an output shaft, such as the shaft 13, as can be noted.

Figure 24:
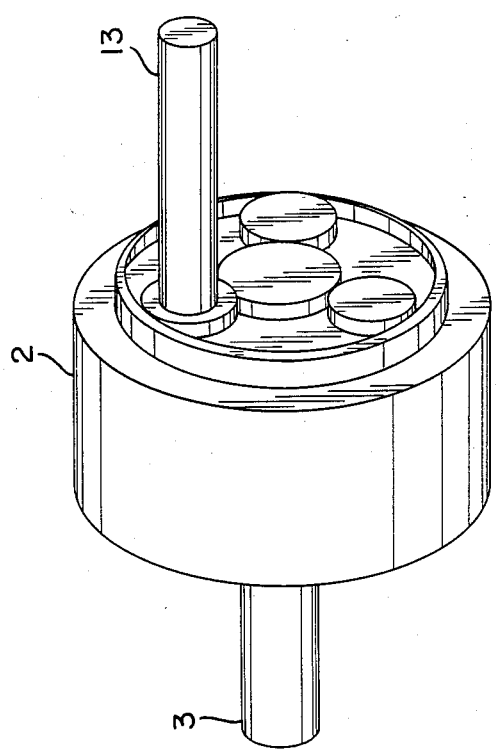
FIG. 24 is a schematic disclosing the use of planetary gearing in conjunction with the driven means.

Obviously, as previously summarized, an infinite number of variations upon the output means utilized in conjunction with this invention can be envisioned, such as a form of planetary gear arrangement (FIG. 24) that may be interconnected within the spider 12, and provide output to another gear, which may be biaxially or coaxially arranged with respect to the input shaft 3. This is just an example. But, in the preferred embodiment, as shown herein, and since the outer race element 11, in this particular instance, will have quasi free floating characteristics, in the manner as previously explained, the output shaft 13 may join with the actual output driven shaft or spline connection 14 through a pair of flexible couplings 23 and 24, so as to provide for compensation in whatever relative movement is made by the outer race element 11, during functioning, but yet provide fixed rotation to the output or driven shaft 13, during its functioning.

Figure 25:
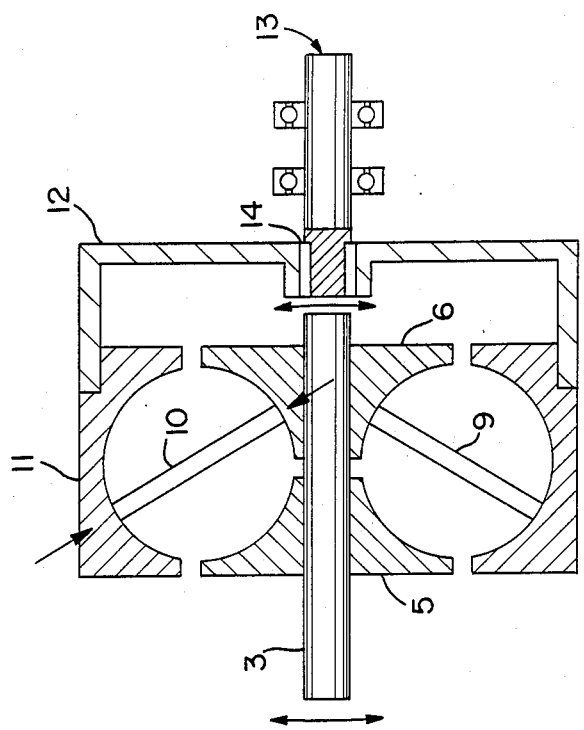
FIG. 25 is similar to the schematic as shown in FIG. 3, disclosing the outer race in conjunction with its driving means, with the inner race being free floating upon its driven shaft.

For the sake of convenience, and just to provide an indication of the stability of this particular device, in its structure, the input shaft 3 may be bearing mounted, as shown at 17, to indicate its stability. On the other hand, as previously summarized, it is likely that in achieving the free floating characteristics that attain the efficient and equalization of forces during operations of this particular device, the inner race element 4 may have the free floating characteristics, while the outer race element 11 may be fixed in position with respect to its see FIG. 25. When this occurs, obviously, the input or drive shaft 3 mounting the inner race elements 5 and 6 will not be fixed in position, but rather, will be shiftable in their mounting, suspended and held into position by means of the location of the transmission roller means 7 through 10, as previously explained.

As previously defined with respect to FIG. 2, while the outer encasement 2 for the transmission means has previously been depicted within the schematic drawings for this invention, it is just as likely that this outer surface 2 may actually comprise the outer surface of the outer toric race element 11, as shown and explained with respect to FIG. 3. Thus, it is shown in this FIG. 3 that the outer surface or encasement for the entire unit, actually, and structurally, may comprise that outer surface of the outer race element 11, as can be noted. On the other hand, an outer protective encasement may be utilized.

In referring to FIG. 5, an isometric view, obliquely taken, shows additional structure for the composite unit of this particular transmission means. For example, this particular view is taken looking down at approximately a forty-five degree angle from an upper corner of the shown device. The outer toroid or race element 11 is shown as continuously encircling the internal mechanisms of this device, but is broken away, and sectioned, in order to disclose these interiorly arranged devices. The transmission means is structurally mounted upon a pair of support means, the initial one comprising the plate 15, which comprises more descriptively a front support plate, with a rear support plate 16 being arranged spacedly and rearwardly therefrom. Upon the outer surfaces of the respective plates are the various hydraulic control means 17a, and which are designed for providing the fluid pressure necessary to attain a shifting in the location of the transmission rollers as previously described, with the rollers 7 and 8 being shown herein. Each of the transmission rollers is bearing mounted and supported by a shaft within its respective trunnion 18, as noted, with one end of each trunnion 18 being pivotally mounted to a lever arm support, one as shown at 19, to provide for the longitudinal and tangential shifting of each respective roller, and its supporting trunnion, in order to provide for variations in the speed of rotation of the various rollers, which in the preferred embodiment, would provide for a variation of the speed of rotation of the rotatable outer race element 11, during functioning of this particular device. To provide stability and structural support between the two front and rear supporting plates 15 and 16, various A-frame shaped supports 20 are provided around the perimeter of the centrally arranged transmission rollers and their trunnions, but yet are conveniently shaped for fitting internally of the outer race element or toroid forming means 11, between the variously located pairs of roller transmission means, 7 through 10, as previously explained. This particular structural relationship will be more thoroughly analyzed subsequently.

Figure 6:
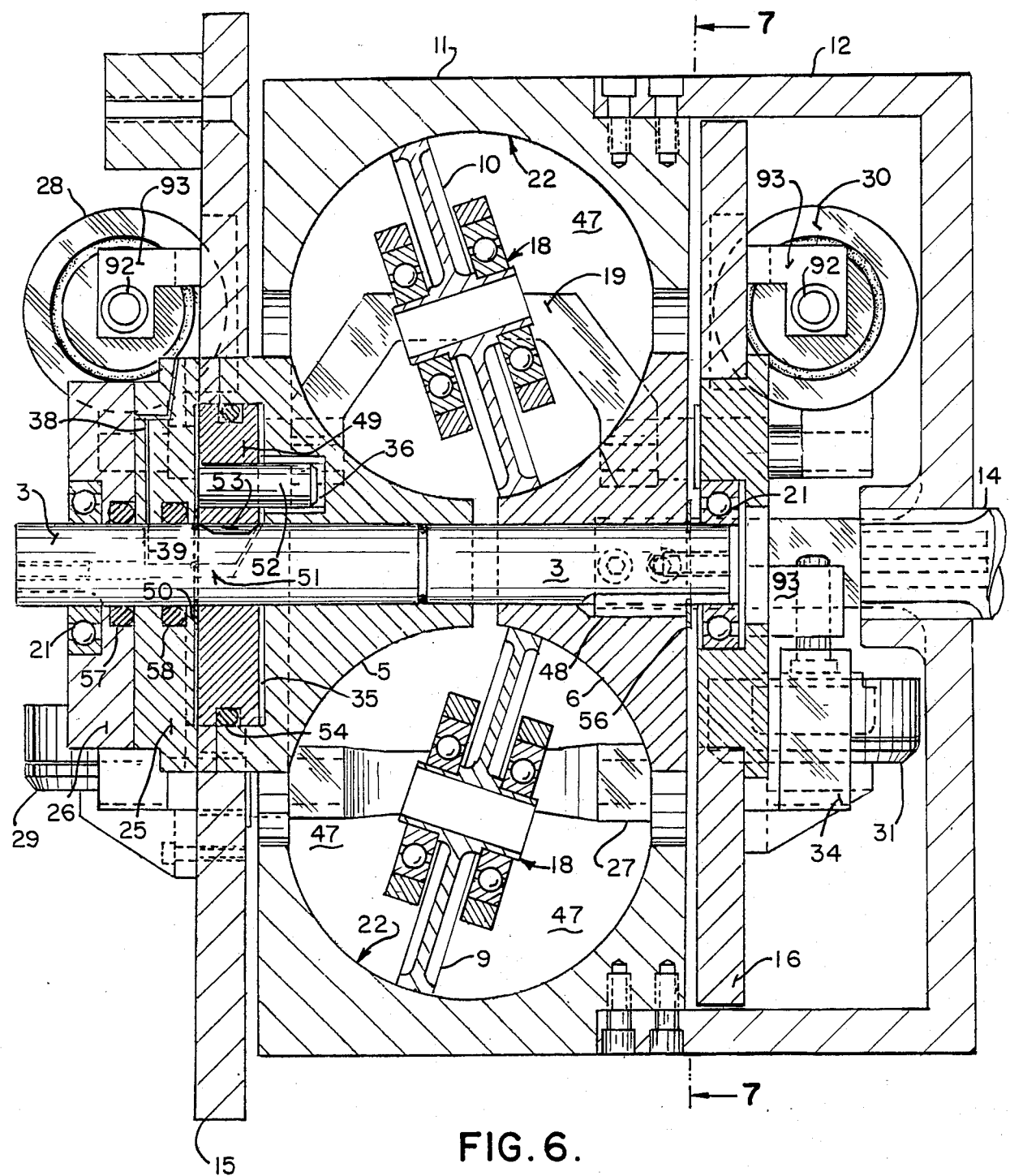
FIG. 6 is a detailed drawing of the transmission means of this invention generally taken in the same position as that shown for FIG. 3, schematically, and FIG. 8 structurally, but with the flexible coupling means shown at the right hand side of these Figures being removed.

Reviewing the structure of this particular invention in greater detail, from that which is shown schematically in FIGS. 1 through 3, can be more aptly seen in addition within FIG. 6. As disclosed herein, similar parts are identified by corresponding reference characters, with the input shaft 3 shown mounting the inner race elements 5 and 6, and being bearing mounted, by means of the bearings 21. In addition, in this instance, the rollers 9 and 10 are shown in greater detail. These rollers are traction engaged with the inner surface, as at 22, of the outer race element 11, and through that relationship transmits a driving force through the spider 12 to output shaft or spline 14, and to the driven shaft 13, as can be noted. (See also FIG. 3). The flexible couplings 23 and 24 are readily disclosed incorporated therein.

Figure 4:
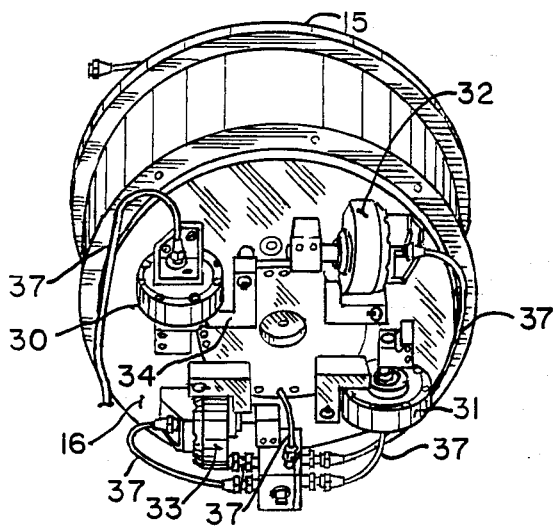
FIG. 4 is a rear view of the transmission mechanism of this invention.

The structural relationship of the transmission means, as disclosed in this FIG. 6, includes the pair of support means, one comprising the plate 15, which may be herein identified as that front support plate 15, as hereinbefore summarized. See also FIGS. 4 and 5. The front support plate 15 has connected to it a hydraulic cylinder forming plate 25, which has likewise connected to it a bearing housing plate 26. Both of these components are rigidly affixed to the support plate 15. On the opposite side of the race elements is that second or rear support plate 16 which incorporates in proximity therewith, as shown centrally hereof, one of the bearings 21, to provide bearinged support or journaled securement for the back end of the drive shaft 3. While it is not shown herein, the rear support plate 16 is cantilever mounted to the front support plate 15, as previously briefly explained, and in this manner provides support and stability for the entire input drive means, the inner race elements 5 and 6, and in the same manner, reasonable stability for the functioning of the various transmission rollers 7 through 10, and also supports the outer but free floating race element 11, during functioning of this particular transmission means.

Each of the rollers 7 through 10 are supported for relatively free, but controlled, rotation by way of the trunnions 18 as noted. Each trunnion, at one end, and as can be noted in FIG. 6 with respect to the upper disclosed roller 10, is supported but yet rendered shiftable by means of its respective lever arm 19, whose structure, and function, has already been summarized herein, and which will be defined in greater detail subsequently in further description provided in this application. A similar type of lever arm 27 is seen at the bottom, in the lower segment of the FIG. 6, but that particular arm actually positions the back transmission roller 8, which is not shown herein, and which is actually disposed on the upper backside of this particular view. Also disclosed within this figure are the various hydraulic means, as previously depicted generally as 17a in FIG. 5, that provide for functioning of the various equalization means as previously summarized in this application, and in this particular instance, there are four sets of hydraulic control means, on each of the supporting plates 15 and 16, and in this FIG. 6, two such hydraulic control means 28 and 29 are shown mounting upon the front support plate 15, and hydraulic control means 30 and 31 are particularly shown mounting upon the rear support plate 16. As can be more accurately seen in FIG. 4, the rear support plate 16 is properly shown as mounting its hydraulic control means, four in number, comprising the members 30 and 31, in addition to the hydraulic control means 32 and 33. As will be subsequently described, each of the hydraulic control means, as for example, the unit 28, manipulates a hydraulic piston that moves a piston arm 34, and which piston arm is connected to a pivotal end of the lever arm 19, or 27, to attain its pivotal shifting, as previously explained, so as to provide for that slight tangential and longitudinal shifting of its respective trunnion 18 and roller 10, intermediate the inner and outer race elements, as can be seen. The reason for this, as previously explained, is to provide a means for finely controlling the positioning and shifting of each roller between the inner and outer race elements, in order to attain a change in their position from the vertical location as shown in FIG. 6, to a more horizontal direction, as when the speed of rotation of the transmission is to be accelerated or enhanced, during functioning of this invention. In any event, as previously summarized, where this particular transmission may, for example, be incorporated within a vehicle, an accelerator pedal, not shown, may provide for a regulation in the functioning of each of the hydraulic control means generally shown at 17a, and specifically at 30 through 33, in addition to the other corresponding four of the hydraulic control means 28, 29, etc., provided upon the front plate 15, for regulating the speed of output from this transmission, during its functioning.

In addition to the foregoing, and as previously alluded to, the inner race element 4 is formed of a pair of such elements, being the inner races 5 and 6, as explained. And, hydraulic means are provided for urging these two race elements closer together, during functioning, and when such hydraulic means is released, the natural bias of these race elements, through the traction force that is exerted upon them by means of the transmission rollers, will cause them to separate apart, once again. Nevertheless, the hydraulic cylinder forming means 25 encloses a hydraulic fluid cavity 35, for urging a hydraulic force within this cavity and the piston cavity 36, for urging the inner race element 5 inwardly, towards the race element 6, and likewise, as this is occurring, the shaft 3 has a natural tendency to be drawn to the left, which in effect causes the inner race element 6 to likewise move slightly towards the inner race element 5, so that equal and simultaneous but opposing movements are achieved by both of these race elements, effecting an equalization of forces simultaneously against all of the transmission rollers 7 through 10, to assure that the same and uniform force is exerted upon all of the rollers, during transmission functioning. The reason for this is that by hydraulically controlling the movement of the inner race element 5, and consequently the inner race element 6 thereby, one can control the amount of pressure and force that is exerted upon all the transmission rollers, and thereby enhancing the amount of torque force that can be developed within the said transmission, and output from the same, through the driven shaft 13, depending upon the amount of acceleration required, and the amount of torque that is necessary to complete a particular mechanical function, for the mechanism or vehicle in which this specific transmission means is located. In any event, this is another form of equalization as provided within the unit, and one that likewise provides for enhanced forces that may be generated through the usage of this transmission, for finely regulating the amount of output that can be attained from it during application.

Figure 8:
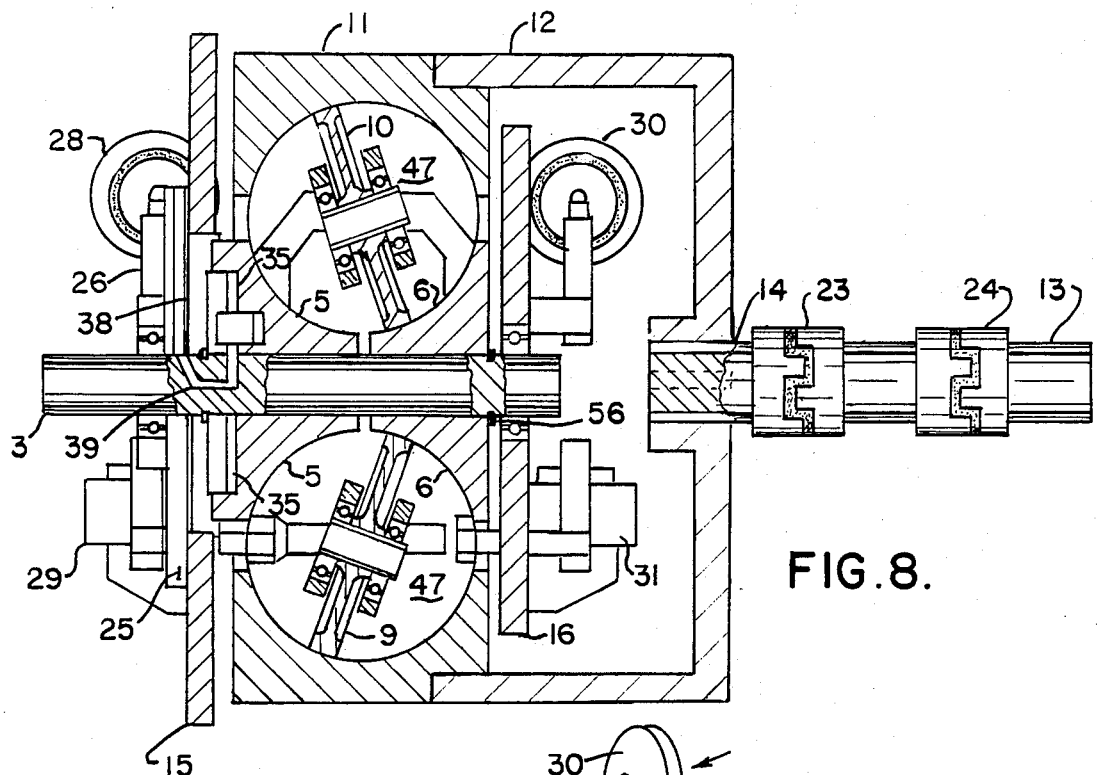
FIG. 8 is a horizontal sectional view taken through the transmission of this invention, similar to that as schematically shown in FIG. 3.

This hydraulic control of the inner race elements 5 and 6, and how they can be utilized for adding compressive type forces that enhance the traction of the shown transmission rollers 9 and 10 is also disclosed in FIG. 8. As can be seen, the rollers are arranged between the said inner race elements 5 and 6, and the outer race element or toroid 11. The input shaft 3 is disclosed bearing mounted to the front and rear plates 15 and 16, with the output shaft 13 coupling through its flexible couplings 23 and 24, which functions as a collinear universal joint, to the driven shaft or spline 14 which is secured to the spider 12, that is fixed with the outer toroid or race 11. As can be seen, when fluid pressure is exerted by hydraulic means within the bearing house plate 26, as through the hydraulic cylinder forming means 25, by way of the hydraulic flow line 37 (See FIGS. 4 and 9) fluid is directed through the conduits 38, through the additional conduit 39, formed through the driving shaft 3, and into the aforesaid fluid cavity 35, for exerting that necessary force upon the inner race element 5. As this occurs, and as can be seen, since the driven shaft 3 is splined to these race elements, which means that the race elements 5 and 6 are free to longitudinally shift upon the driving shaft 3, the clip 56 causes the attraction of the inner race element 6, to the left, as previously described, to provide equalization and simultaneous shifting, together, of the two inner race elements 5 and 6. The passage of fluid under pressure through the shaft 3, or through the conduit 39, tends to force the said shaft 3 to the left as shown therein. The hydraulic fluid that is exerted through the hydraulic line 37 may be from an independent source, and actuated, once again, by some form of pedal or other control means, or it may be coupled to the same acceleration pedal or other manual or automatic control that compresses hydraulic fluid flowing to the other hydraulic control means, or cylinders 30 through 33, as on the back plate 16, or the corresponding cylinders 28, 29, and 40 and 41 provided on the front plate. See also FIG. 9. As can also be noted, there are a variety of hydraulic fluid flow lines 42 through 45 that lead from a master hydraulic valve 46 to these various flow lines, and to their respective cylinders, that are also mounted upon the front plate 15. And, as previously explained, while the hydraulic flow line 37 is shown as being independently extending from the hydraulic cylinder forming plate 25, beneath the bearing housing plate 26, it is just as likely, as previously explained, depending upon the type of control desired for the operations of this transmission, and its application, that the hydraulic fluid leading through the hydraulic line 37 could just as likely be controlled from the same control means, or acceleration pedal, that regulates the fluid flowing through the various hydraulic lines connecting with the variety of hydraulic control or solenoid means 30 through 33, as on the back plate, and 28, 29, 40, and 41, mounted upon the front plate 15. In addition, obviously, other forms of pressure, such as pneumatic pressure, or even mechanical actuating pressure, could be utilized to achieve the same effect.

A further detailed analysis of the particular structural components of this invention are shown in said FIGS. 6, 8, and 11 and 12. As shown in these figures, the invention, in its structural detail, is provided with greater analysis, than the schematics as shown in FIGS. 1 through 3, or the overall outline of the invention as generally depicted and previously described with respect to FIG. 5. The actual structure, for the preferred embodiment of this invention, is that which is shown in these particular FIGS. 6 through 12.

As can be seen, the traction roller transmission of this invention is shown in these figures, and it is likely that there may be an overall housing, such as the housing 2 as previously briefly alluded to, provided, but which is not disclosed as being incorporated within this particular unit. On the other hand, as previously explained, the outer surface of the outer race element 11 may comprise the outer housing for this particular unit. As explained, the transmission unit incorporates the input or drive shaft 3, rotatably supported therein by the bearings 21, as noted. Coaxially associated with the input shaft 3 are the inner toric traction races 5 and 6, as explained, and the outer toric traction race element 11, so arranged such that the outer race has an opposite disposition with the inner races to form a toric cavity 47 of generally circular cross section arranged about the axis of the shaft 3. Within the toric cavity are these variety of pairs of traction rollers 7 through 10, as previously explained, that are rotatably positioned in traction engagement with the race surfaces of these race elements, and in the preferred embodiment, with the outer race element being supported for free floating by the rollers for traction rotation therewith, during functioning of this transmission unit.

The inner toric race element 6, or that one which is located more rearwardly of the unit, is coaxially mounted upon the input shaft 3, and is rotated by turning of said input shaft through the usage of the woodruff key or splined connection 48. This race element 6 is axially slidably disposed on the input shaft 3, and is so arranged to have its axial motion limited by the inner toric race 5, and which race 5 is limited in its positioning by means of the hydraulic piston 49 and the stop means or key 50, the latter of which is fixed upon and located within a groove surrounding the drive shaft 3. Thus, when hydraulic pressure is applied to the hydraulic cylinder plate 25, by way of its aforesaid internally formed channel 38, that fluid passes into and through that flow line or conduit 39 developed integrally within the drive shaft 3, and passes through the formed communicating flow line 51 for entrance into the hydraulic chamber 35, as previously described. The piston 49 likewise rotates with the inner race element 5, and a series of pins 52 are disposed within the counterbores 36, which are bushing lined, as noted, which allows for simultaneous movement and drive of the said piston 49, with the inner race element 5, but at the same time, allows for their relative displacement with respect to each other, as when hydraulic fluid under pressure enters into the said chamber 35, thereby forcing the inner race element 5 towards the inner race element 6, as previously explained. One or more keys or interconnecting pins 53, spline the drive shaft 3 to the piston 49, to attain their simultaneous movement. And, through the agency of the positioning pins 52, there actually being three in number, the inner race element 5 likewise attains its rotation. But, as previously explained, it is desired and required to have that relative displacement with respect to these two components, the piston 49, and the inner race element 5, so as to attain that inward movement of the inner race element 5, towards the race element 6, when it is desired to increase the amount of force that may be transmitted or entertained by this transmission during its operation. As can be seen, an 0-ring 54 provides for a fluid seal between the inner cavity 35 formed within the inner race element 5, and the outer periphery of the hydraulic piston 49. In any event, the piston 49 is generally restricted in position with respect to the drive shaft 3 by means of that key or stop means 50.

In any event, when hydraulic fluid is added under pressure within the cavity 35, and which forces the inner race element 5 to move to the right, or towards the inner race element 6, there likewise is that slight drawing upon the drive shaft 3, also due to its pressurized fluid therein, which pulls the inner race element 6 towards the race 5, an equivalent distance of displacement, so that equal forces will be exerted upon all of the roller means simultaneously, regardless whether their inner roller edges may be exerting traction upon either one or the other of the inner race element 5 or 6, as can be noted from their positioning within the schematics as shown in FIGS. 1 and 2. To achieve such, the inner race element 6 is likewise held in position by its stop means 56, which is keyed onto the drive shaft 3, within a formed groove, where noted. Thus, if during this hydraulic operation the drive shaft 3 moves slightly to the left, as the inner race element 5 is forced by hydraulic pressure to the right, the stop means 56 will draw the inner race element 6 with it, to provide for simultaneous movement of these two race elements towards each other, during transmission functioning. But, when the hydraulic fluid pressure is released from the cavity 35, the two race elements 5 and 6 move apart from each other, simultaneously, an equivalent distance, mainly due to the traction forces exerted upon them by the variety of rollers.

It may also be noted that hydraulic seals 57 and 58 are provided within the structure, biasing against the drive shaft 3, at slightly spaced positions, so as to provide a seal for the hydraulic fluid that is passing through the flow line 38, and into the cavity 39 within the said drive shaft.

Figure 9:
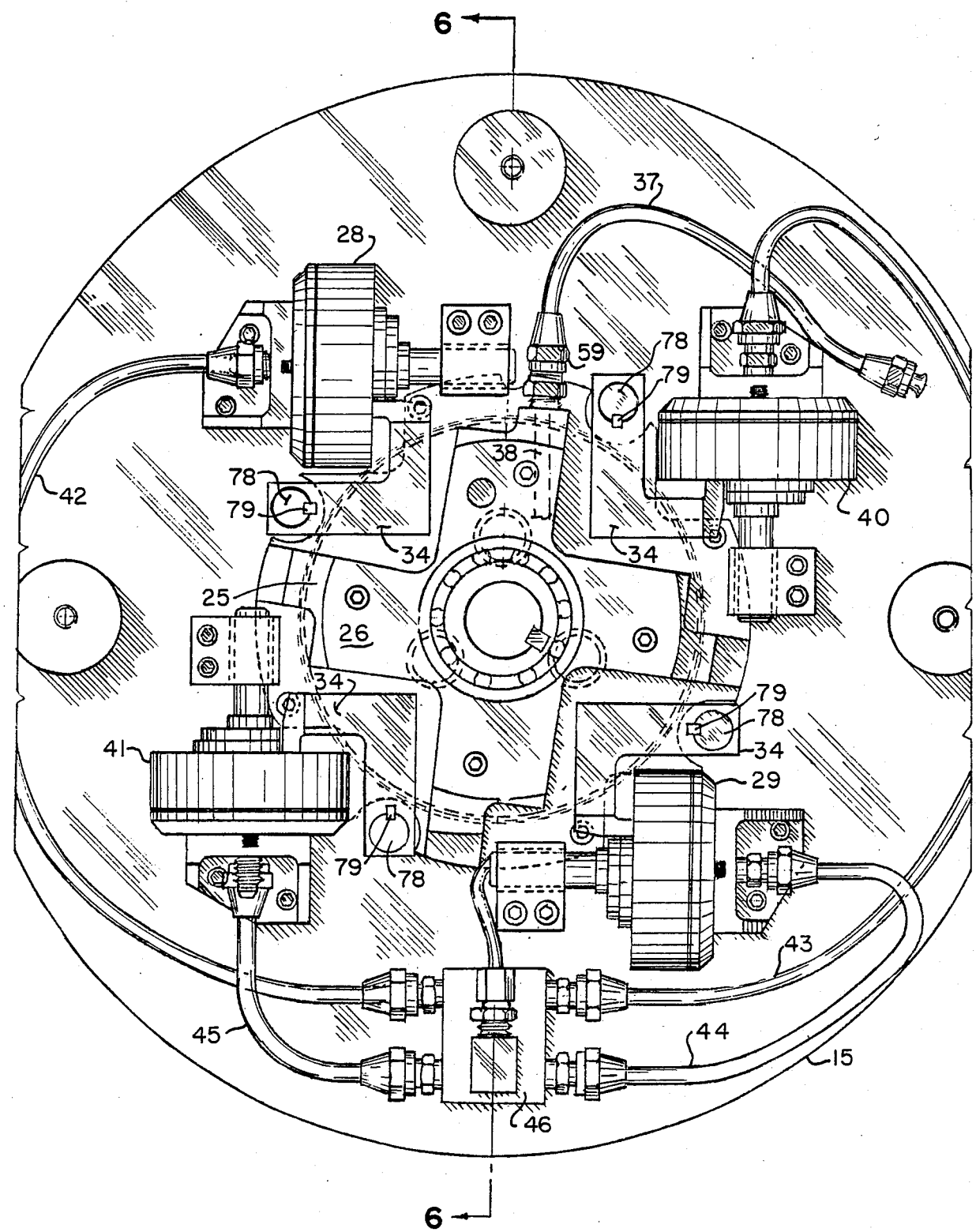
FIG. 9 is a front view of the transmission mechanism of this invention.

It should also be noted, in FIG. 9, that the hydraulic fluid that enters into the flow line 38, through the plate 25, enters by way of that hydraulic line 37, that connects on a nipple, as at 59, which threadedly engages onto the said plate. The other end of the hydraulic line 37, as previously explained, may connect with whatever control means is desired for the systematic operations of this particular feature of the invention, and regardless whether it be a form of hydraulic cylinder, that may be pedal actuated, hand controlled, or whatever, and which will apply that pressure to the hydraulic fluid to provide for functioning of this particular feature within the overall operations of the invention. By applying such pressure to the fluid, and supplying the same to the hydraulic piston cylinder 35, pressure is applied to the adjacent surface of the piston 49, and the inner cavity facing of the race element 5, and this exertion of pressure in turn forces the inner race to slide in an axial direction along the input shaft 3, and likewise draws the inner race 6 towards it, in the manner as previously described. This in turn generates a normal load that is applied to the traction rollers at the point of contact between said rollers and the toric surfaces of the inner race elements, and likewise, exerts a force through the rollers to the contacted tractioned surface of the outer race element 11. And, because the outer race element 11 is supported by all of the traction rollers, this load is equally distributed amongst all of the pairs of rollers embodied within the structure of this invention, which, as shown in the preferred embodiment, comprises two such pairs of transmission rollers, although, for reasons as previously summarized, may comprise additional pairs of such rollers as desired and required for a particular application.

Figure 19:
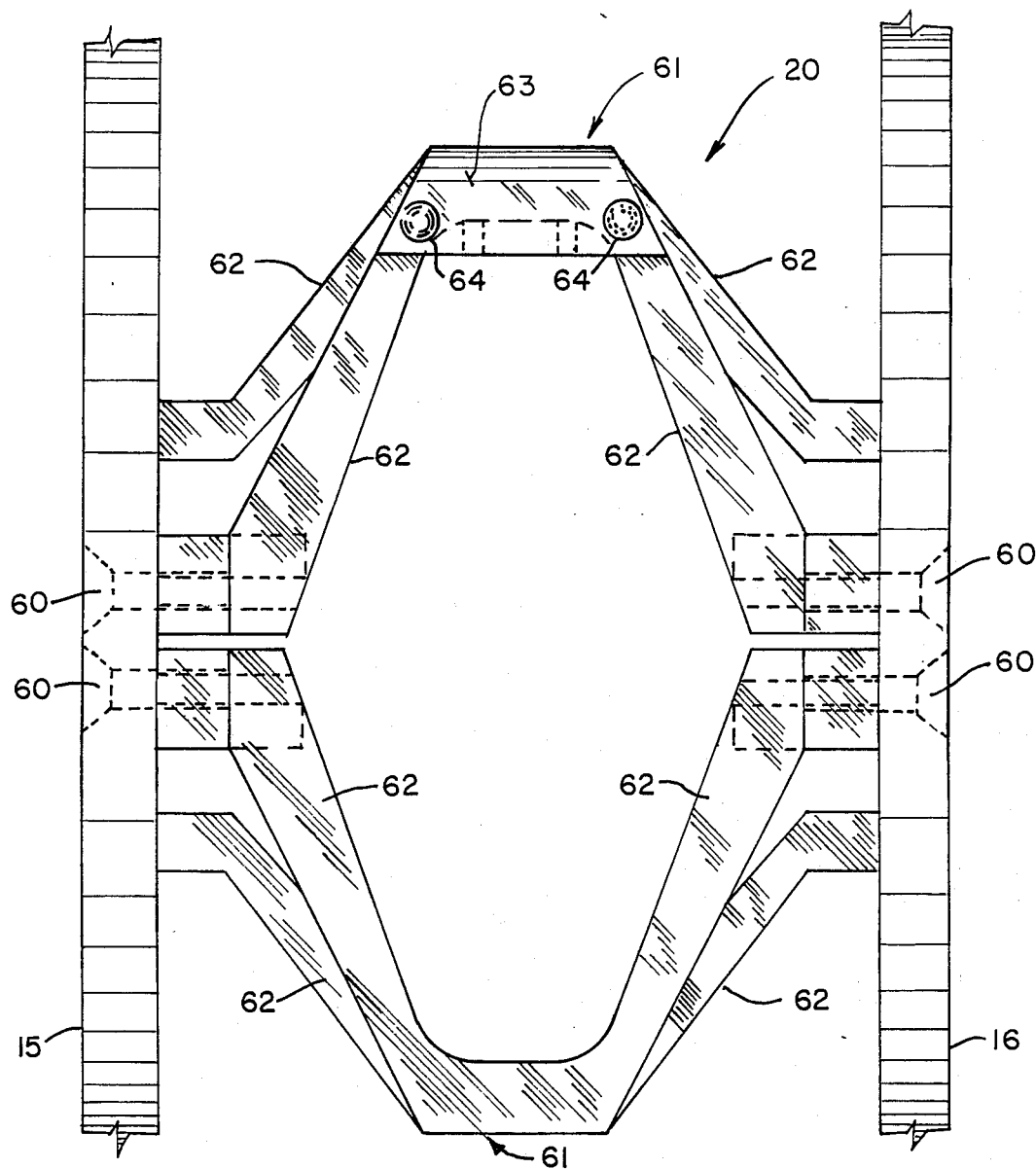
FIG. 19 is a top view of a pair of frame means mounting between the front and back support plates of this transmission mechanism.

As previously alluded to, in defining the structural support or fixed relationship of various of the components of this invention within the transmission, as can be seen in FIG. 5, the front support plate 15, while rotatably mounting the various shaft 3, rollers, and races, also has the rear support plate 16 rigidly secured thereto, by means of the A-frame means 20. See also FIGS. 7 and 19. These A-frame means 20 are rigidly connected to the inner surfaces of the support plates 15 and 16, by means of the shown fasteners, as at 60, and at the apex of each support, as at 61, they are arranged approximately intermediately between each of the transmission rollers, as can be so clearly seen in said FIG. 5, through the convenient arrangement of such A-frames between the shown rollers 7 and 8 as previously explained. This locating of these components is quite tight, as can be understood, since the outer toroid or race element must yet fit entirely surrounding the transmission rollers and the A-frames, without the A-frames providing any interference therewith, or the transmission's operations. Thus, the positioning of the rear support plate 16 in a cantilevered fashion by means of its structural connection to the front support plate 15, through the agency of the series of A-frame means 20 is readily accomplished and provides that rigid support for the permanent structures of this particular transmission unit, and more specifically the drive shaft 3, and its mounted inner race elements 5 and 6, as previously explained, for attaining a controlled rotation of the outer race and its connected driven shaft. For the purpose of further clarification, and as can be also seen in FIG. 7, the reason why the A-frame type structures 20 are utilized in the provision of rigid support between the support plates 15 and 16, with these A-frame means rigidly connecting to each plate, at a more inwardly location, is to provide that required adequate clearance for the locating of the outer race element 11 surrounding these structural components, which race, as can be seen, is continuous in its extension around the circumference of this transmission unit, and also possesses that free floating characteristic as supported upon the various rollers, as previously explained. Thus, the shape of the A-frame members 20, as can be seen, are complimentary of the general internal toroid shape of the outer race element 11, and allows clearance for its operative repositioning within the transmission structure.

Figure 7:
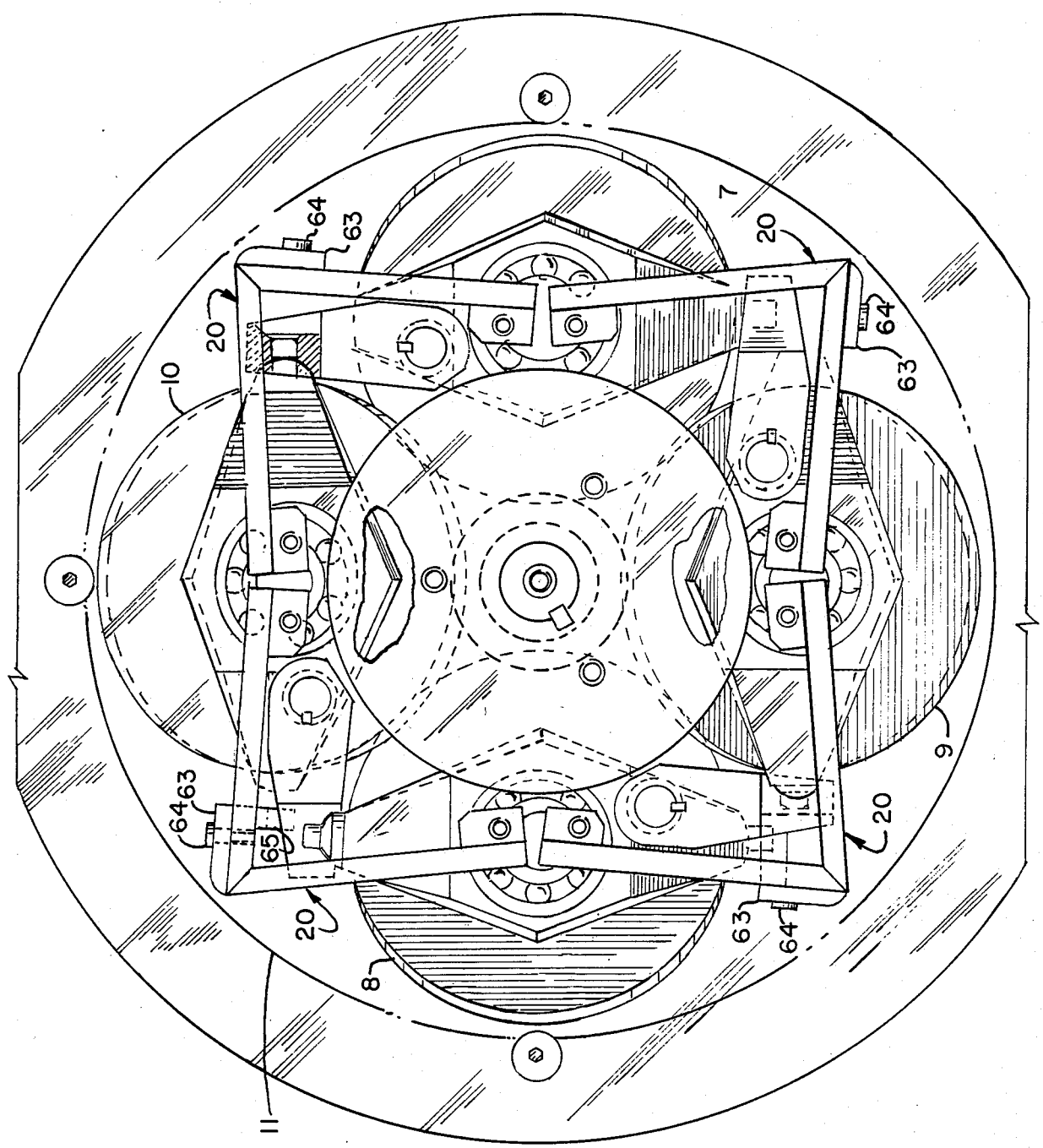
FIG. 7 is a sectional view of the transmission mechanism just inwardly of the back support plate taken along the line 7—7 of FIG. 6, but with the outer race element being removed to accurately disclose the transmission roller means, and frame means of this invention.

By way of explanation, while the outer race element 11, as shown in FIGS. 6 and 7, is disclosed as a solid or integral component, it is likely that it could be constructed of halves, similar to those as shown for the inner race elements 5 and 6, and once the support plates 19 and 22 are assembled, and the A-frames 20 fastened in place, the outer toroid 11, as may be formed of such halves, could then be bolted together, into its operative position and condition. This would add to the convenience of its assembly.

Figure 22:
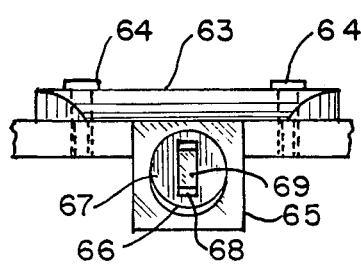
FIG. 22 is an end view of the radial shift bracket connecting with the frame means for supporting the proximate end of the trunnioned roller means, as previously explained in FIGS. 16 and 17.

As previously explained, the front support plate 15 has rigidly affixed to it the support plate 16 in a cantilevered manner, by means of the carry-through structure consisting of these four A-frames 20. See FIGS. 7 and 19. The inclined leg 62 of every A-frame 20 is mounted to the internal surface of the support plates 15 and 16 by the fasteners 60 as previously explained. Along the apex of each A-frame 20 is mounted a trunnion bracket 63, each held in position by means of the shown fasteners 64. As can also be seen in FIG. 22, each bracket 63 has a depending supporting flange 65, which has an annular opening 66 provided therein. Within this annular opening is provided a bushing 67, which likewise incorporates a central slot, as at 68, formed therein. Disposed within the slot 68 is one end, as at 69, of one of the trunnions 18, supporting a transmission roller, such as the roller 8, as shown. See also FIGS. 16 through 18. Thus, as can be noted, each trunnion 18 is supported, at least at one end, such as the rectangularly shaped end 69, by means of a rigidly supporting A-frame means 20. But, even in that rigid mounting of each frame means, as can be noted, the proximate end of each trunnion 18 is yet free to undertake some heightwise or radial shift of its end 69 within the formed frame slot and bushing 67, and likewise, due to the circular shape of the bushing 67, within the annular opening 66, the trunnion is free to undertake some degree of pivot, for itself and its respective supported roller, as when the speed of this transmission is being varied, in the manner as previously explained. The heightwise shift allows the trunnioned rollers to shift radially within the transmission structure to provide for equalization of forces within the races during roller functioning.

Figure 16:
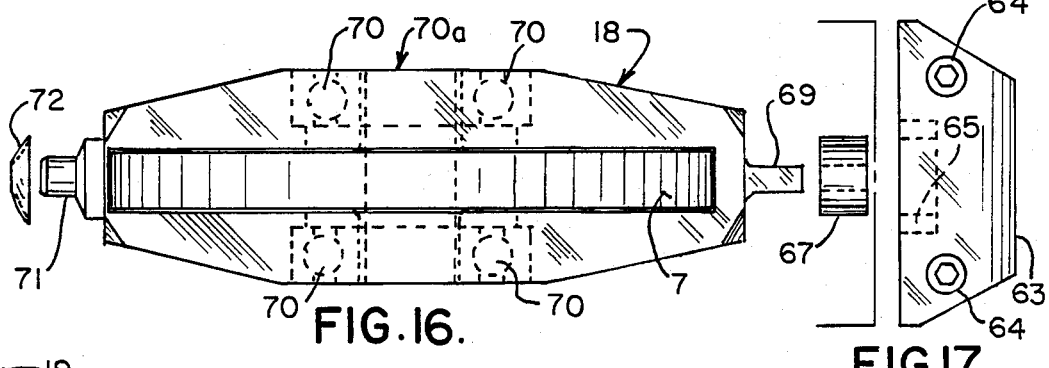
FIG. 16 is a top view of one of the trunnioned roller means of this invention.
Figure 17:
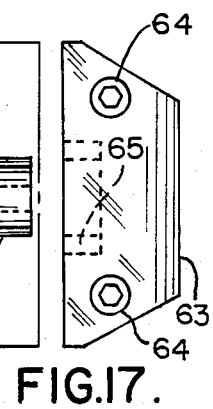
FIG. 17 is a top view of one of the positioning brackets for holding and allowing radial shifting of the opposite end of the trunnioned roller to the proximate support frame of this invention.
Figure 18:
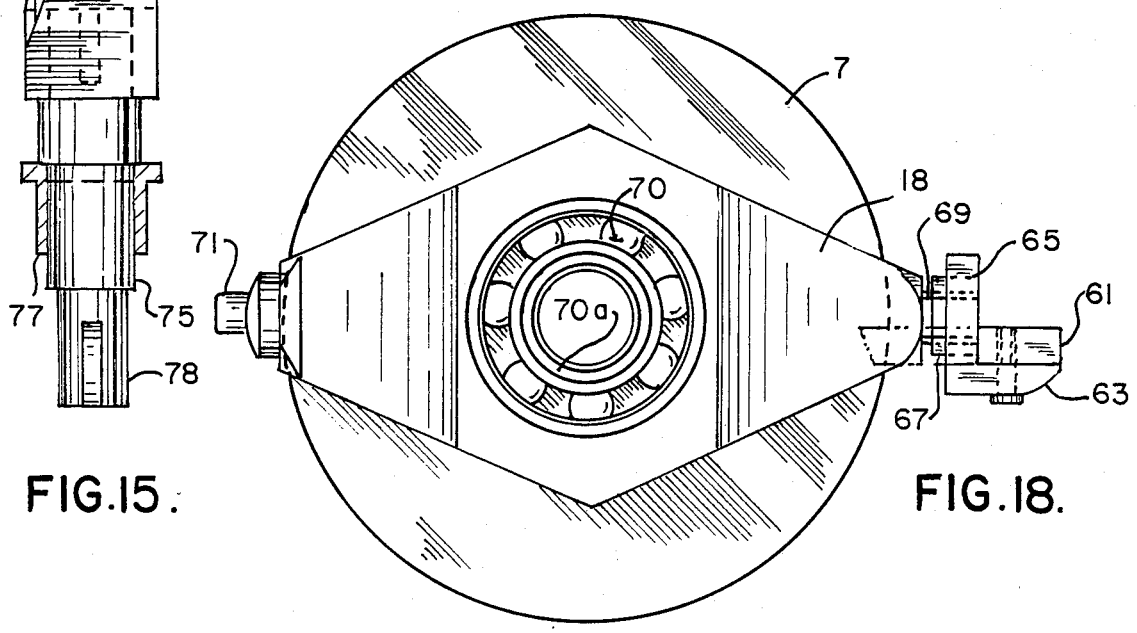
FIG. 18 is a side view of one of the trunnioned roller means of this invention.

Each of the trunnions 18 support a transmission roller, such as 7 through 10, as previously identified, are more aptly disclosed in FIGS. 16 and 18. As can be noted, each roller, and whether it be any one of the rollers 7 through 10, is bearing mounted upon a roller supporting shaft, as at 70 and 70a, to its trunnion 18 by means of the shown bearings, and is free for relatively near frictionless rotation therein. Obviously, the diameter of each roller is determined by the spacing between the position of the inner and outer toroid surfaces formed of the inner and outer race elements, so that tractional forces are exerted between these surfaces, and the outer periphery of each roller, to attain the transmission of motion, and force, from the input, to the output shafts, through the usage of this invention. The opposite end of each trunnion includes an additional extending shaft, as at 71, and which shaft pivotally mounts within its associated lever arm, such as one of the lever arms 19 or 27 as previously explained, as in FIG. 6. There is a lever arm associated with one end of each trunnioned roller. Each lever arm provides, during functioning, for the tangential shifting of each roller, as when a variation in the speed generated through this transmission is to be acquired. This has already been previously briefly referred to with regard to the description of the embodiment as shown in FIGS. 5 and 6, as summarized in this application. What does need to be defined, and recognized, is that the axis of pivot of the shaft 71 must be co-linear with the center of the extending tab 69, and which likewise, must be aligned with the center of rotation of its supported transmission roller, as bearing mounted within its shown trunnion.

Figure 15:
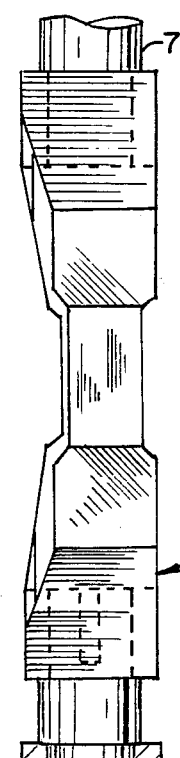
FIG. 15 is a top view of one of the lever arms as used for positioning and tangentially shifting a trunnioned roller means of this invention.
Figure 23:
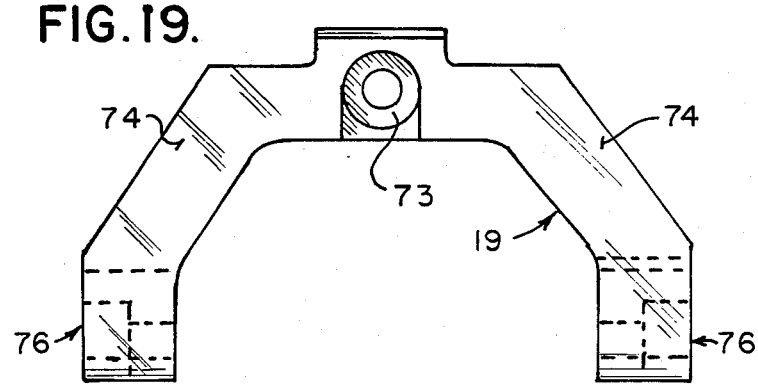
FIG. 23 is a front view of one of the lever arms, without its connecting and integral support shafts, as shown in FIG. 15.

As previously explained, each of the trunnioned rollers has a lever arm 19 operatively associated with it, and it is through the operations of its lever arm that the tangential shifting of the trunnioned rollers can be achieved, to attain variation in the speed transmitted through this transmission during its functioning. As previously summarized, the location of contact of the rollers with the surfaces of the inner and outer race elements, determines the angular orientation of each roller within the formed toroid space 47, and the amount of speed to be attained from the transmission during its functioning. Thus, the means for tangentially shifting of the trunnioned rollers, within the toroid space, is attained, simultaneously, through the actuation of their operatively connecting lever arms 19. Schematically, this can be seen in FIGS. 10 and 11, where each trunnioned roller, the roller 7 alignment being shown, mounts at its proximate end by means of the insertion of its shaft 71 within the bushing 72, and seats within a complimentary cavity 73 formed approximately centrally of each lever arm 19, or 27. This is also more aptly disclosed in FIG. 23. Each arm, at each side, extends approximately outwardly and downwardly, through its integral structure, as at 74, and is formed with means for mounting of pivot shafts, as at 75, that extend outwardly from their supporting apertures, as at 76, as provided on each side of each arm, as noted. These shafts are designed for pivotal mounting within or through their respective support plates 15 and 16, and may incorporate bushings, such as one as shown at 77 (See FIG. 15), to minimize friction and wear in its pivoting through the said support plates. Each of the shafts 75 extend further outwardly, as shown at 78, where they are engaged by means of a key, as at 79, to a pivot arm 34, (See FIG. 9), each of which interconnects with one of the hydraulic pistons 28 through 33, and 40 and 41, which, when actuated, provides for pivot of its respective piston arm 34, for transmission of a pivotal motion to its associated lever arm 19, for attaining a slight shifting, tangentially, of each of the associated trunnioned rollers 7 through 10, in order to vary the positioning of the rollers within the inner and outer race elements, and therefore, vary the transmitted speed that is attained through the operations of this transmission device.

Depending upon the tangential location of the transmission rollers within the toroid opening 47, if the lever arms provide for shifting of the rollers in one direction, this may attain a slow down in the speed of transmitted force, to the output shaft 13, and generally the slowest speed generated by the transmission during functioning will be when the rollers undertake the solid line position as shown schematically in said FIG. 3, as previously explained. On the other hand, should the trunnioned rollers be shifted by means of their lever arm in an opposite tangential direction, as when influenced by traction forces, within the toroid spacing, this has a tendency to cause a different or skewed tractional force to be generated upon the roller surfaces, causing them inherently to shift in a pivotal direction, and consequently effect a speed up or slow down in the output, and inversely the transmitted torque, through the operations of the transmission. This relationship is shown for the various transmission rollers as disclosed in the solid and hidden lines, in said FIG. 3. Hence, the speed generated through the usage of this transmission can be effected either by a speed up in the rotation of the driving shaft 3, or in the alternative, or simultaneously, a tangential shifting in the location of the trunnion rollers within their toroids, can likewise effect an additional speed up or slow down in the output through the shown driven shaft 13. These are various methods in which speed can be transmitted through this particular transmission, and output torque varied depending upon the adjustments made to it during its functioning.

Figure 20:
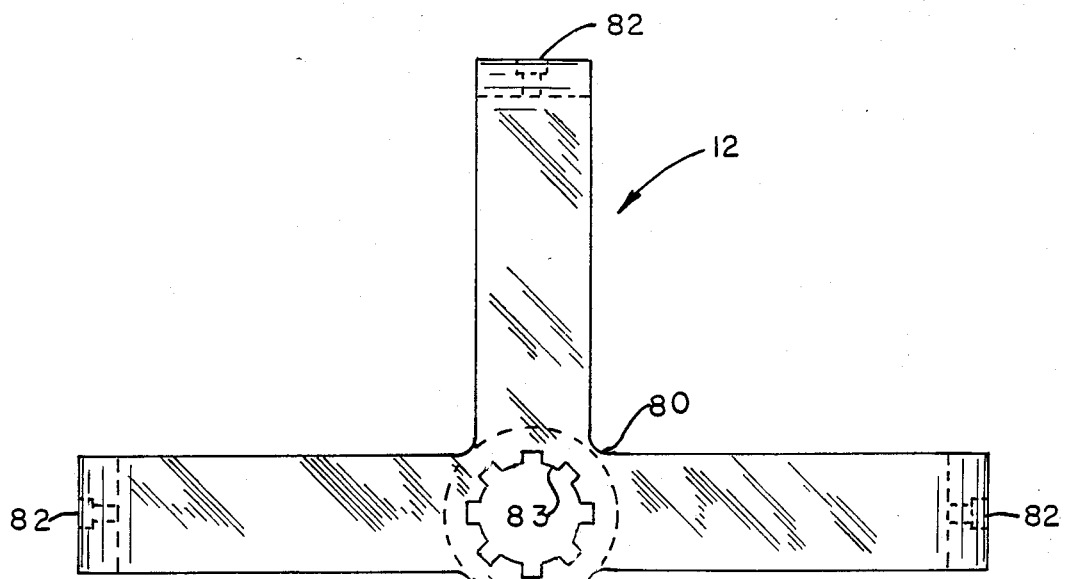
FIG. 20 is a back view of the spider that connects with the outer race element and for connecting with an output driven shaft of the type that may be coaxially aligned with the input shaft of the preferred embodiment of this invention.
Figure 21:
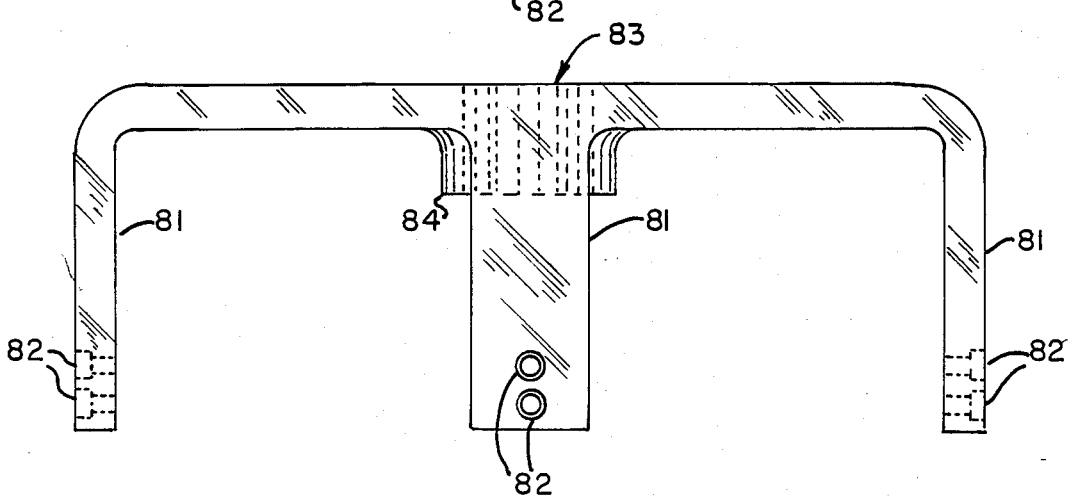
FIG. 21 is a side view of the spider member shown in FIG. 20.

The output from the outer toroid 11, as previously reviewed, is transmitted through its connected spider 12, as also disclosed in FIGS. 20 and 21. The spider simply includes a main cross section frame member 80, with outer inturned arms 81, there being four in number, extending towards the said outer race element, and being connected therewith by means of the the fasteners that extend through the various apertures 82, as disclosed. The center of a spider includes a ribbed aperture, as at 83, that functions as a spline connection, as at 14, that extends inwardly within an integrally formed shaft 84, with the ribbed internal portion, as shown, generally cooperating to function as a spline means, for interconnecting with the said shaft 13, to provide it with some means for allowing slight shifting of the said shaft 13, therein, during functioning of this particular device. This is necessary due to the equilibrium that is attained within this particular transmission, during functioning, especially since the outer toroid 11 is generally free floating, in the preferred embodiment, upon its traction rollers 7 through 10. Obviously, the spider means as shown is simply one method in which output can be attained from this particular invention. It has already been summarized herein just how other forms of output can be attained from this development, during its functioning. This is just an example of one device which may be incorporated within the structure of this transmission to obtain an output force.

Figure 13:
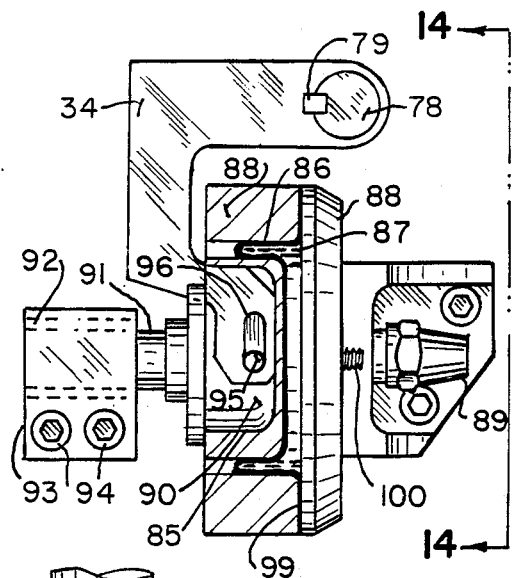
FIG. 13 is a sectional view of one of the hydraulic pistons showing its rolling diaphragm as used for pivoting its transmission pivotal lever arm that connects to one end of one of the lever arms invention.
Figure 14:
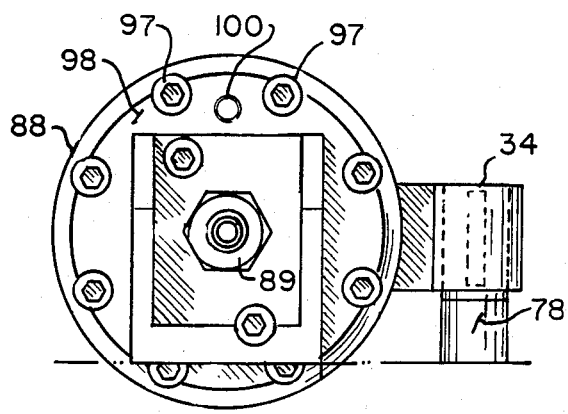
FIG. 14 a side view of the piston means taken along the line 14—14 of FIG. 13.

Each of the various hydraulic control means 28 through 33, and 40 and 41, are constructed identically, and are disclosed more particularly in FIGS. 13 and 14. These are the various types of hydraulic controls, as previously explained, that are mounted to the external surfaces of the supporting plates 15 and 16, and which provide functioning to the extending shaft portions 78 of each of the lever arms 19, or 27, as previously reviewed. Each of the hydraulic control means includes a piston-like means, as at 85, and which has mounted thereon a rolling diaphragm 86. The piston 85 and its rolling diaphragm 86 are located within a chamber, as at 87, formed within the cylinder head 88. A fitting, as at 89, is disposed for being coupled by one of the hydraulic flow lines 37, or 42 through 45, and provides for the entrance of hydraulic fluid, under pressure, into the chamber 87, to act upon the piston 85, and its rolling diaphragm 86. When this occurs, the piston head, internally thereof, includes a center frame, as at 90, and which connects with a positioning shaft 91, that is mounted within the bushing 92, of the mount 93, which, as can be seen, is threadedly engaged onto the surface of its respective support plate, by means of the fasteners 94, as shown. The purpose of the shaft 91 is to stabilize the shifting of the piston head 85, upon the exertion of hydraulic fluid under pressure within the chamber 87, between the positioned rolling diaphragm 86, and the entrance of the fluid therein. The center frame 90 includes a lateral pin, as at 95, and mounted upon the pin, but in sliding engagement therewith, is one of the piston arms 34, as previously explained. An elongated slot, as at 96, mounts the piston arm upon the pin 95, so that upon shifting of the piston head 85, within its piston chamber, such allows the pin to ride within the elongated slot, but likewise to cause a slight pivotal motion to the piston arm 34, which in effect achieves a pivotal motion to the extending shafts 78, on either side of the lever arms 19 or 27, to achieve pivotal motion to each lever arm, simultaneously, and to effect that tangential shifting of each of its respective and connected trunnions 18, and their respectively supported transmission rollers. As previously explained, and summarized, the exertion of the hydraulic fluid pressure though the fitting 89, by way of one of the hydraulic lines, as previously explained, from the main valve 46, may be achieved through the exertion of pressure upon an acclerator pedal, or some other control, that is used to provide the manual or automatic means for effecting controlled operations of this transmission device, in providing a determination as to the amount of output torque to be generated through the driven shaft 13.

As can also be seen in FIG. 14, within the piston cylinder 88, the cylinder head 98 is fixed into position by means of the series of fasteners 97, which, as can be seen, provides for fixing the outer peripheral edge, as at 99, of the rolling diaphragm into position for proper functioning. It is to be also noted that a bleed valve, as at 100, may be provided for tapping of the hydraulic fluid, from within each cylinder, as may be required.

Figure 11:
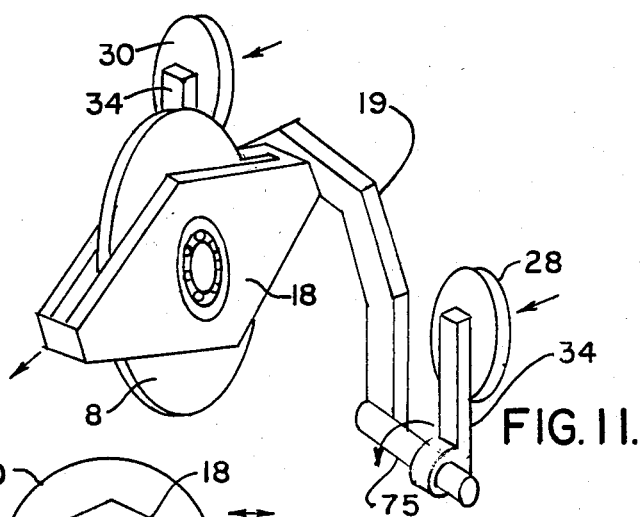
FIG. 11 is a perspective view similar to that of the trunnioned roller means as disclosed in FIG. 10, showing the positioning lever arm and schematically the pair of hydraulic actuator pistons which function to pivot said lever arm at each of its sides.
Figure 12:
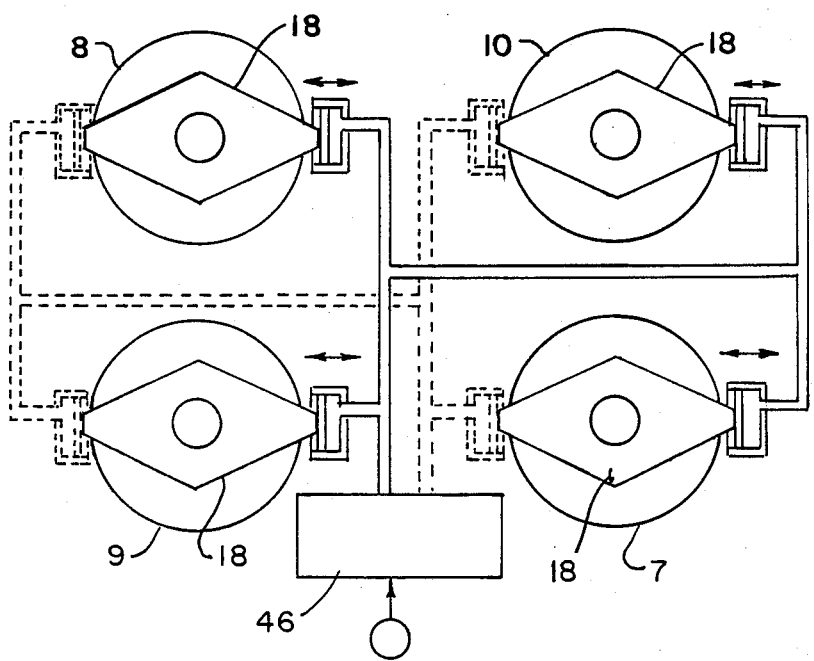
FIG. 12 is a schematic view of the hydraulic flow circuit for each of the trunnioned roller means of this invention as shown schematically in FIGS. 1 and 2, and showing the master hydraulic cylinder, at the bottom, which provides hydraulic force for shifting of the positioning lever arms of each roller means, as generally shown in FIG. 4.

FIGS. 11 and 12 disclose, schematically, the overall assembly of each trunnioned roller, as support upon its lever arm, during functioning. As can be noted, the trunnion 18 mounts one of its respective rollers, such as at 8 as shown, for rotation. The back end of the trunnion 18 is connected, in a manner as previously described, to its lever arm 19. The lower outward end of each lever arm extends by way of its shaft 75 for interconnection with one of the piston arms, schematically shown at 34, and which piston arm is positioned for actuation by one of the hydraulic control means, such as 28, and 30, as shown. This generally depicts the structural relationship between these various components for achieving, simultaneously, that tangential shifting required of each trunnioned roller during functioning of this transmission device. FIG. 12 discloses how all four of the transmission rollers 7 through 10, and their supporting trunnions 18, are actuated through hydraulic control means, as through the hydraulic flow lines, as shown, from its master valve 46, to attain this simultaneous tangential shifting of the various trunnioned rollers during functioning and control of this device.

Having provided an explanation of the general summary of the results to be obtained from the structure of this particular invention, and having defined its various components herein with respect to the preferred embodiment of this transmission device, its method of operation should be fairly clear to those having skill in the art in light of the description previously provided. As earlier reviewed, the transmission device basically operates upon the traction principle, and that is to provide means for generating a rotation of a first race element, which in this particular instance, comprises the inner race means formed of the pair of race components 5 and 6, as previously explained. In the preferred embodiment, it is the forced rotation of these various race elements, through the torque provided through the input driving shaft 3, that furnishes a frictional or tractional rotational force to the various pairs of roller means, or transmission rollers 7 through 10, and which provides a corresponding tractional rotation to the outer toroid or outer race means 11, as previously explained. As stated, in the preferred embodiment, it is the rotation of the inner race elements, that provides a tractional force through the positioned rollers, that furnishes a rotation to the outer race or toroid 11, of this particular invention. On the other hand, as also previously alluded to, and summarized, it is just as likely that the methods for providing torque through this transmission means, could just as easily be accomplished in reverse, by having the outer toroid being forcefully turned by means of an input torque or driving means, to furnish rotation to its associated pairs of rollers, to furnish a driving rotation to the inner toroids 5 and 6, for providing output through the shaft 3, if desired. In addition, it is just as likely that additional pairs of transmission rollers, other than the two pairs as described herein, could be utilized in conjunction with the structure and functioning of this transmission means.

The summary of this invention also reviewed that the essence of this particular development is the addition of equalization means within the structure of this device, in order to provide for a balancing of forces, throughout the transmission, during its functioning, so as to operate most efficiently and effectively in providing transmission of the various input to the output torque generated through usage of this device, and at the same time, minimize frictional wear and tear in addition to force imbalancing deterioration that would occur upon a transmission of this design if such equalization means were not provided. Initially, a first equalization means, nd that which varies the output torque that may be generated through this invention, and likewise provide for an increase or decrease in its transmitted speed, is accomplished through the usage of the hydraulic control means 28 through 33, and 40 and 41, as previously described. Each of them, when receiving a thrust of pressurized hydraulic fluid, simultaneously, from some exterior control, as previously reviewed, exerts a pivotal motion upon its associated piston arm 34, which likewise effects a pivot to the shafts 78, to the interior of the transmission device, for causing a pivotal shifting to the particular lever arms 19, in the manner as previously described, for tangentially shifting the respective trunnions 18, that support the various transmission rollers 7 through 10, in the manner as previously reviewed. This effects a forceful pivot by the exertion of hydraulic fluid upon the said control means, that causes the shifting, as for example, counterclockwise to the various transmission rollers, as shown in FIG. 7, which also causes a tangential relocation of the rollers with respect to their contact upon the inner toroid surfaces, of their respective inner races 5 and 6, which also effects a speed up in the rotation of the outer toroid, essentially because when this condition prevails the transmission rollers tend to pivot, along with their trunnions, within their respective lever arms 19, and their flange supports 65, to a position of that shown in FIG. 3, in hidden line, which provides for a maximum speed of output of the transmission means, from the inner races, to the outer race, which in effect provides a greater speed of rotation for the output or driven shaft 13, during functioning of this particular device. In addition, as can be seen, since the pairs of rollers are disposed oppositely with respect to each other, the lateral vector forces generated during their functioning, in this manner, tend to equalize and counterbalance each other, so as to minimize any generation of moments or rotating bearing forces that would tend to cause a disparity in the internal forces generated within this transmission device, during its functioning.

Another equalization means includes the usage of the split inner toroid, or race means, formed by those race elements 5 and 6, as previously explained. These components can be shifted towards each other, or away from each other, as previously described, in that additional hydraulic fluid, or other means, under pressure, can either come from the same source as the previously explained hydraulic pressure source, or from an additional control means, passed through the hydraulic line 37, into and through the plate 25, through the driving shaft 3, as by passing through its various channels 39, and into the cylinder spacing 35, as previously explained. Exertion of fluid pressure therein causes the inner toroid or race element 5 to be moved inwardly, upon the shaft 3, while likewise, a counter force generated within the driving shaft 3 pulls the inner toroid 6 towards the inner toroid 5, so as to provide equal and opposite exertion of forces upon the transmission rollers 7 through 10, in the manner as previously explained. Thus equalization of forces is also attained.

Hence, while corresponding and opposing forces may be exerted by the various inner toroids 5 and 6 against their respectively contacting transmission rollers, these forces will be equal and opposite with respect to each other, counter-balancing each other, so as to minimize if not eliminate any unequal vector forces in the longitudinal direction, along the length of the various driving and driven shafts, and thereby prevent the generation of any moments or bearing forces, in those directions, as a result of the balancing of forces as attained through this particular type of mechanism by these cooperating structural components.

A third equalization means involves the free floating characteristics as provided for, in the preferred embodiment, for the outer race 11 of this particular transmission. Thus, should any uneven or unbalanced forces be exerted by the roller means within the toroid structures of this particular transmission, the free floating characteristics of the outer toroid allows for it to shift as required in order to balance out any of these generated disparity of traction forces thereby allowing the transmission rollers to shift, radially, as may be required, in order to achieve balancing of forces within the transmission so as to minimize any binding forces that otherwise would and could lead to rapid deterioration of the transmission during prolonged usage.

In addition, the trunnioned rollers are each provided at one end also, with means for radial shifting, as within the slot 68, to further allow for balancing any uneven forces that may be generated.

These are examples of the various operative components within the structure of this transmission device, how they function either independently or together, to provide a very effective operating transmission device, which in the designed prototype, functions quite satisfactorily to provide not only the torque output desired from a transmission of this design, but affords precise regulation in the selection of force generated through the usage of this transmission, and all done under such conditions that provide for complete equalization of the forces generated within it, so as to minimize any wear and tear upon the transmission, especially during its prolonged usage.

Theoretically, it is likely that the transmission of this invention can be utilized for affording both forward direction of movement to any industrial application, or vehicle, or even a reverse movement thereto, through the applications of this transmission. But, it is understood that the transmission, while achieving such, will always be attaining the transmission of its output force through the same direction of rotation of its roller means within the toroid cavity. Hence, other forms of clutch mechanisms, some of which may even be available in the art, act in conjunction with this transmission means to obtain an outright reversal in the movement of any vehicle or other equipment in which this transmission is located. On the other hand, it is likely that when this particular transmission may be undertaking a deceleration in its functioning, that while the rotation of the roller means will be in their same forward direction, the tractional forces being exerted, and consequently its transmitted torque, may be exerted in an opposite direction within the toroid spacing. Thus, it is likely that forces may be exerted upon the various roller members, and particularly their supporting trunnions, such that it may require enhanced structural support in the interconnection of the trunnion means with their various brackets, and the lever arms, in order to sustain their proper functioning and operation. For example, it may be necessary to provide for a positive connection between the extending stem 71, as mounted within its bushing 72, and supported within the lever arm cavity 73. For example, perhaps a fattening means may be required to pivotally fix the stem 71, and its bushing 72, to the lever arm 19, or 27, as previously explained. In addition, it may be that the hydraulic piston means 28 through 33 and 41 and 42 may by necessity be redesigned as double acting pistons, so that the pivot arms 19 and 27 can be pivoted in an opposite direction, and pull the trunnion roller members against the traction forces being generated between the inner and outer race means, in order to achieve the desired deceleration that may be required during functioning of this transmission. Hence, as can be obviously understood, a double acting hydraulic circuit would be required to function in combination with each double acting piston, to achieve its desired results. Or, in the alternative, as shown in FIG. 12, a separate acting piston, those as shown in hidden line in said FIG. 12, may function at the opposite end of each trunnioned roller, to force each roller means in an opposite direction of tangential shift, in order to attain that desired and necessary deceleration for this transmission, during usage.

Variations or modifications to the subject matter of this invention, the structure of the transmission device itself, and its methods of operation, may occur to those skilled in the art upon reviewing the description of the invention as provided herein. Such variations or modifications, if within the spirit of this invention, are intended to be encompassed within the scope of any claims to patent protection issuing upon this development. The description of the preferred embodiment set forth herein is done so for illustrative purposes only.

Having thus described the invention what is claimed and desired to be secured by Letters Patent is:

1. A traction transmission mechanism comprising a toric inner race element, a toric outer race element, encircling and complimentary with the inner race element, and arranged concentric therewith, a driving means operatively associated with one of the race elements to drive the same, a race element support means, one of said race elements being the driving race and the other of said elements being the driven race, said driving race element being formed of separate halves, transmission roller means operatively associated with said driving and driven race elements and arranged for limited pivot between the race elements to drive by traction force the said driven race element from the driving race element and thereby mounted for angular pivotal adjustment to vary the speed of the driven race element, said driven race being supported only by the driving race and the transmission roller means, and at least three equalization means operatively associated with said transmission roller means and race elements to balance any unequal forces exerted therein upon the roller means during transmission functioning, and a driven means operatively associated with the other of said inner and outer race elements and providing output force upon functioning of the transmission mechanism, said equalization means including a first equalization means operatively associated with the said transmission roller means to provide for the tangential shifting of said roller means between the race elements to induce speed variation in the output derived from the transmission mechanism, the second equalization means operatively associated with the transmission roller means, wherein said roller means being substantially loosely supported at least at one of its ends to provide for variation in the radial spacing provided between the race elements, and a third equalization means operatively associated with the transmission mechanism and providing for adjustment in the setting of the space between separate halves of one of said inner and outer race elements, with respect to each other.

2. The invention of claim 1 and wherein said equalization means including race element support means for mounting of said inner and outer race elements within the transmission mechanism, and with one of said race elements within its mounting means having substantially floating characteristics and supported by the other race element, to provide for its shifting in at least one of a circumferential, radial, axial, pitch, and yaw movements.

3. The invention of claim 1 and wherein said first equalization means providing for the tangential adjustment in the mounting of the transmission roller means between the race elements to provide for inherent adjustment in the roller means angular positioning through differing traction forces generated upon said roller means during functioning of the transmission mechanism.

4. The invention of claim 1 wherein said second equalization means incorporating means for mounting of said transmission rollers within the transmission mechanism, including a roller mounting means supporting each of the roller means, said roller means at least at one end being loosely supported by its roller mounting means, and said roller mounting means providing for inherent adjustment in the radial shifting of said roller means during operation of the transmission mechanism.

5. The invention of claim 1 and wherein said third equalization means including a race element support means for mounting of at least one of said inner and outer race elements within the transmission mechanism, said mounting race element formed as the two separate halves of the toric race element, and said race element support means incorporating means for shifting said race element halves towards or away from each other to provide for adjustment in the settling of the race element halves with respect to each other to vary the tractional force generated by the race elements upon the transmission roller means.

6. The invention of claim 1 and wherein said outer race element being supported in a substantially floating mount upon the roller means and the inner race element.

7. The invention of claim 1 and wherein said inner race element being supported in a substantially floating mount upon the roller means and the outer race element.

8. The invention of claim 4 and including bracket means mounting to said transmission rollers at least at one end thereof, and providing for the limited displacement radially of said transmission rollers against the inner surface of the outer race element to provide for said outer race element support with an accompanying balancing of radial forces during transmission mechanism functioning.

9. The invention of claims 1, 3, 4, or 5, and wherein said transmission roller means generating a radial force that provides the means for mounting and support of said outer race element, said outer race element being substantially floating in its mounting to provide for an equalization of the radial forces generated against it through its contact with the transmission roller means provided therein during transmission mechanism functioning.

10. The invention of claim 9 and wherein said driven means being operatively associated with the outer race element and with said outer race element being driven thereby, and flexible coupling means interconnecting said driven means to said outer race element.

11. The invention of claim 9 and wherein said driving means operatively associated with said outer race element, and thereby driving said outer race element, and flexible coupling means interconnecting between said driving means and said outer race element.

12. The invention of claim 9 and wherein said driving means being operatively associated with said inner race element, and with said inner race element being driven thereby, and flexible coupling means interconnecting said driving means with said inner race element.

13. The invention of claim 12, and wherein said driving means comprising a drive shaft, and being operatively associated with said inner race element, and thereby driving said inner race element during transmission functioning, and flexible coupling means interconnecting said drive shaft with said inner race element.

14. The invention of claim 9 and wherein at least one of said driving means and driven means incorporating a planetary gear in its operations.

15. The invention of claim 9 and including support means for said inner race element, said support means including a first support disposed for bearing mounting said inner race element, a second support, said second support being cantilever mounted from said first support and disposed on an opposite side of said inner race element, shaft means bearing mounted for rotation between said first and second supports, said shaft means supporting said inner race element for rotation, said transmission roller means being trunnion supported between said race elements and by said first and second supports, said roller means disposed for riding upon said inner race element, said outer race element disposed for riding upon in free floating motion and maintained in rotation upon the said transmission roller means, and outer race element being rotated thereby and providing an output torque during transmission mechanism functioning.

16. The invention of claim 9 and wherein said driving means comprising a drive shaft, and said driven means comprising an output shaft, and said shafts being one of a collinear, bi-axial, or planetary driven in their disposition within the transmission mechanism.

17. The invention of claim 16 and wherein said driven shaft operatively associated with the inner race element, and the output shaft operatively associated with the outer race element.

18. The invention of claim 16 and wherein said drive shaft operatively associated with the outer race element, and said driven shaft operatively associated with the inner race element.

19. The invention of claim 16 and including a flexible coupling means provided in said output shaft, said with flexible coupling means comprising at least one collinear universal joint and an axial shift spline means provided within the coupling.

20. The invention of claim 16 and wherein said outer race element being formed of a pair of race surfaces, and securing means interconnecting said race surfaces together during transmission operation.

21. The invention of claim 16 and wherein said inner race element mounted upon the drive shaft, said inner race comprising a pair of race surfaces, each race surface being separate from the other, said pair of race surfaces capable of shifting with respect to its supporting drive shaft, whereby adjustment in the traction forces exerted upon the roller means between the inner and outer races being effected through shifting of said inner race surfaces with respect to each other.

22. The invention of claim 21 and including force actuating means operatively associated with at least one of the inner race surfaces and providing for its shifting upon its supporting shaft means to furnish adjustment in the exertion of traction forces upon the transmission rollers as disposed between the inner and outer race elements.

23. The invention of claim 22 and wherein said force actuating means comprising a hydraulic actuating means.

24. The invention of claim 23 and wherein one of said race surfaces having a hydraulic chamber formed in proximity therewith, a supply of hydraulic fluid provided within the hydraulic chamber, the pressure of the hydraulic fluid exerted within said hydraulic chamber inducing the shifting of said one race surface upon is supporting shaft with respect to the other race surface, and thereby effecting a shift of the said race surfaces towards each other during the exertion of hydraulic fluid pressure within the formed hydraulic chamber.

25. The invention of claim 5 and including said race element support means for one of said inner and outer race elements, and providing a substantially fixed support for one of said race elements during its rotation, said transmission roller means being trunnion supported by said support means and arranged between said inner and outer race elements for simultaneous rotation therewith, drive means operatively associated with one of said race elements, and transmitting rotation thereto, an output means operatively associated with the other of said race elements and furnishing an output torque during transmission mechanism operation.

26. The invention of claim 25 and including frame means interconnecting between said first and second supports, and providing at least partial support for the trunnioned transmission roller means.

27. The invention of claim 26 and wherein said frame means extend substantially intermediate adjacent roller means.

28. The invention of claim 27 and including a lever arm means for each trunnion roller means and being pivotally mounted between said first and second supports, said trunnion roller means being supported at least at one end by one of said lever arm means, and thereby disposing said roller means for limited tangential displacement between the said inner and outer race elements, the opposite end of each trunnion roller means supported for at least one of limited axial and radial displacement by one of said frame means, and said roller means also disposed for limited pivot about their respective trunnion axes depending upon its location of contact with the contiguous inner and outer race elements.

29. The invention of claim 28 and including bracket means connecting upon the frame means and supporting the opposite end of each trunnion roller means for limited angular, tangential, and radial displacement.

30. The invention of claim 29 and including actuation means operatively associated with said lever arm means, and when functioning, providing for the limited pivotal movement of each lever arm and thereby inherently effecting the limited tangential shift for each trunnioned transmission roller means.

31. The invention of claim 30 and wherein said actuation means being hydraulically actuated.

32. The invention of claim 30 and wherein said actuation means being electrically actuated.

33. The invention of claim 30 and wherein said actuation means being mechanically actuated.

34. The invention of claim 30 and wherein said lever arm means having ends, and each end supported for pivotal movement by one of said supports, and said actuation means being provided upon both said first and second supports, and furnishing actuation force to the lever arm means at both of its ends.

35. The invention of claim 34 and wherein there being a pair of hydraulic pistons for each of the lever arms, one of each pair mounted upon one of the supports, and providing a parallel form of hydraulic circuit for simultaneous actuation of said hydraulic pistons for simultaneous functioning of each of the lever arm means and their associated trunnion roller means during transmission functioning.

36. The invention of claim 35 and including a pivot arm operatively associated with each hydraulic piston, and said pivot arm connecting with an end of the lever arm, whereby upon functioning of said hydraulic piston the piston arm causes a limited pivot to the said connected lever arm.

37. The invention of claim 36 and wherein said hydraulic piston and pivot arm for each lever arm being disposed exteriorly of its said support.

38. The invention of claim 37 and wherein each hydraulic piston incorporating a rolling diaphragm, and which when hydraulic fluid pressure is exerted thereon effects a shifting of its internally arranged piston, and thereby a pivot motion to its pivot and lever arms.

39. The invention of claim 30 and wherein said actuation means capable of pivotally shifting said lever arm in opposite directions and thereby induce an acceleration of said transmission when the transmission roller means are tangentially shifting in one direction, and inducing a deceleration of said transmission when the trunnioned roller means are tangentially shifted in an opposite direction.

40. The invention of claim 39 and wherein piston means induce the pivotal shifting of said lever arm in the opposite directions of movement.

* * * * *

UNITED STATES PATENT AND TRADEMARK OFFICE
CERTIFICATE OF CORRECTION

PATENT NO. : 4,885,949
DATED : December 12, 1989.
INVENTOR(S) : John S. Barber, Jr.

It is certified that error appears in the above—identified patent and that said Letters Patent is hereby corrected as shown below:

Claim 1, line 54, after "other of said", insert ---race---.

Claim 17, line 61, change "driven" to ---drive---.

Claim 19, line 2, change "said with" to ---with said---.

Signed and Sealed this

Sixteenth Day of October, 1990

Attest:

HARRY F. MANBECK, JR.

Attesting Officer

Commissioner of Patents and Trademarks